(12) United States Patent
Chen et al.

(10) Patent No.: US 12,720,537 B2
(45) **Date of Patent: *Aug. 25, 2026**

(54) POWER CONTROL PARAMETERS FOR MULTI-TRP PUSCH REPETITION

(71) Applicant: QUALCOMM Incorporated, San Diego, CA (US)

(72) Inventors: Yitao Chen, San Marcos, CA (US); Mostafa Khoshnevisan, San Diego, CA (US); Fang Yuan, Beijing (CN); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 237 days.

This patent is subject to a terminal disclaimer.

(21) Appl. No.: 18/559,630

(22) PCT Filed: May 11, 2021

(86) PCT No.: PCT/CN2021/093043

§ 371 (c)(1),
(2) Date: Nov. 8, 2023

(87) PCT Pub. No.: WO2022/236672

PCT Pub. Date: Nov. 17, 2022

(65) Prior Publication Data

US 2024/0251403 A1 Jul. 25, 2024

(51) Int. Cl.
*H04W 72/1268* (2023.01)
*H04L 5/00* (2006.01)
(Continued)

(52) U.S. Cl.
CPC ....... *H04W 72/1268* (2013.01); *H04L 5/0048* (2013.01); *H04W 52/10* (2013.01);
(Continued)

(58) Field of Classification Search
CPC ........... H04W 72/1268; H04W 72/232; H04W 72/23; H04W 52/10; H04W 52/242; H04W 52/325; H04W 72/0473; H04L 5/0048
See application file for complete search history.

(56) References Cited

U.S. PATENT DOCUMENTS 11,671,925 B2 6/2023 Chen et al.
2019/0349867 A1 11/2019 Molavianjazi et al.
(Continued)

FOREIGN PATENT DOCUMENTS

CN 110536399 A 12/2019
CN 110858996 B 2/2022
(Continued)

OTHER PUBLICATIONS

Huawei, et al., "Enhancements on Multi-TRF for Reliability and Robustness in Rel-17", 3GPP TSG RAN WG1 Meeting #104bis-e, R1-2102334, 3rd Generation Partnership Project, Mobile Competence Centre, 650, Route Des Lucioles, F-06921 Sophia-Antipolis Cedex, France, vol. RAN WG1, No. E-meeting, Apr. 12, 2021-Apr. 20, 2021, Apr. 7, 2021, 15 Pages, XP052177054, Sections 3.1, 3.2.
(Continued)

*Primary Examiner* — Samina F Choudhry
(74) *Attorney, Agent, or Firm* — Patterson & Sheridan, L.L.P.

(57) ABSTRACT

Certain aspects of the present disclosure provide techniques for communicating using power control parameters for multiple transmitter receiver point (mTRP) physical uplink shared channel (PUSCH) repetition. A method that may be performed by a user equipment (UE) includes receiving a sounding reference signal (SRS) configuration indicating at least a first SRS resource set and at least a second SRS resource set, receiving downlink control information (DCI) scheduling a first set of one or more PUSCH repetitions to
(Continued)

a first TRP and a second set of one or more PUSCH repetitions to a second TRP, and transmitting the first and second sets of PUSCH repetitions using at least one of a first set of default power control parameters or a second set of default power control parameters.

28 Claims, 13 Drawing Sheets

(51) Int. Cl.

| | |
|---|---|
| ***H04W 52/10*** | (2009.01) |
| ***H04W 52/24*** | (2009.01) |
| ***H04W 52/32*** | (2009.01) |
| ***H04W 72/044*** | (2023.01) |
| ***H04W 72/23*** | (2023.01) |
| ***H04W 72/232*** | (2023.01) |

(52) U.S. Cl.
CPC ....... *H04W 52/242* (2013.01); *H04W 52/325* (2013.01); *H04W 72/0473* (2013.01); *H04W 72/23* (2023.01); *H04W 72/232* (2023.01)

(56) References Cited

U.S. PATENT DOCUMENTS

| | | | | |
|---|---|---|---|---|
| 2021/0029650 | A1* | 1/2021 | Cirik | H04W 52/248 |
| 2021/0184812 | A1* | 6/2021 | MolavianJazi | H04L 1/0041 |
| 2022/0225362 | A1* | 7/2022 | Yi | H04L 1/189 |

FOREIGN PATENT DOCUMENTS

| | | | | |
|---|---|---|---|---|
| EP | 3975440 A1 | 3/2022 | | |
| WO | 2020166625 A1 | 8/2020 | | |
| WO | 2021038656 A1 | 3/2021 | | |
| WO | WO-2022205408 A1 * | 10/2022 | | H04L 5/00 |

OTHER PUBLICATIONS

Qualcomm Incorporated: "Enhancements on Multi-TRP for PDCCH, PUCCH and PUSCH", R1-2101447, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, 28 Pages, XP051971612, p. 16-p. 19.

Supplementary European Search Report—EP21941248—Search Authority—The Hague—Dec. 20, 2024.

TCL Communication: "Enhancements on Multi-TRP for PDCCH, PUCCH and PUSCH", R1-2103660, 3rd Generation Partnership Project, Mobile Competence Centre, 650, Route Des Lucioles, F-06921 Sophia-Antipolis Cedex, France, vol. RAN WG1, No. E-meeting, Apr. 12, 2021-Apr. 20, 2021, Apr. 7, 2021, 7 pages, XP052178333, Section 3.2.

ZTE: "Enhancements on Multi-TRP for PDCCH, PUCCH and PUSCH", R1-2100286, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, 25 Pages, XP051970901, Section 2.2.3.

Intel Corporation: "Multi-TRP Enhancements for PDCCH, PUCCH and PUSCH", R1-2100637, 3GPP TSG RAN WG1 #104-e, e-Meeting, Jan. 25-Feb. 5, 2021, (Year: 2021), 17 Pages, XP051971107, Retrieved from the Internet: URL: https://ftp.3gpp.org/tsg_ran/WG1_RL1/TSGR1_104-e/Docs/R1-2100637.zip R1-2100637.docx [Retrieved on Jan. 19, 2021] Figures 5, 6.

International Search Report and Written Opinion—PCT/CN2021/093043—ISA/EPO—Feb. 10, 2022.

Lenovo, et al., "Enhancements on Multi-TRP for PDCCH, PUCCH and PUSCH", R1-2100274, 3GPP TSG RAN WG1 #104-e, e-Meeting, Jan. 25-Feb. 5, 2021, (Year: 2021), 17 Pages.

Moderator (Nokia), et al., "Summary of Multi-TRP for PUCCH and PUSCH", R1-2101784, 3GPP TSG RAN WG1 #104-e, 3GPP Draft, R1-2101784, 3rd Generation Partnership Project (3GPP), Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 26, 2021 (Jan. 26, 2021), XP051975886, 61 Pages, p. 48-p. 50.

OPPO: "Enhancements on Multi-TRP for PDCCH, PUCCH and PUSCH", R1-2100119, 3GPP TSG RAN WG1 #104-e, e-Meeting, Jan. 25-Feb. 5, 2021, (Year: 2021), 16 Pages.

QUALCOMM: "Semi-Static Power Control Parameters for mTRP PUSCH Repetitions", San Diego, 2018, received on Feb. 24, 2022, 12 Pages.

VIVO: "Further Discussion on Enhancement of MTRP Operation", R1-2007645, 3GPP TSG RAN WG1 #103-e, 3rd Generation Partnership Project, Mobile Competence Centre, 650, Route Des Lucioles, F-06921 Sophia-Antipolis Cedex, France, vol. RAN WG1. No. e-Meetihg, Oct. 26, 2020-Nov. 13, 2020, Oct. 24, 2020, XP051946Z154, 15 Pages.

Taiwan Search Report TW111113982 TIPO Nov. 4, 2025.

3GPP: "3rd Generation Partnership Project, Technical Specification Group Radio Access Network, NR, Multiplexing and Channel Coding (Release 16)", Technical Specification, 3GPP TS 38.212 V16.4.0, Dec. 2020, Jan. 8, 2021, pp. 1-152.

3GPP: "3rd Generation Partnership Project, Technical Specification Group Radio Access Network, NR, Physical Layer Procedures for Control (Release 16)", Technical Specification, 3GPP TS 38.213 V16.4.0, Dec. 2020, Jan. 8, 2021, pp. 1-181.

* cited by examiner

100
HSS
174
Other MMEs
164
MME
162
EPC
160
MBMS GW
168
Serving Gateway
166
BM-SC
170
PDN Gateway
172
IP Services
176
UDM
196
Other AMFs
193
AMF
192
SMF
194
UPF
195
5GC
190
IP Services
197
Power Control Component
199
Power Control Component
198
102/180
182'
182"
182
184
132
134
120
158
154
150
152
104
102
102 (102')
110
110 (110')

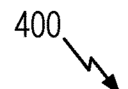
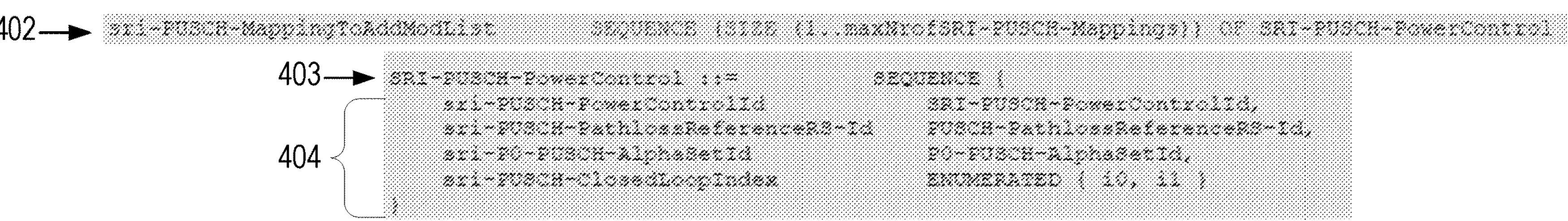
*FIG. 4*

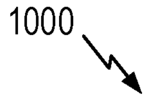

A METHOD BY A BASE STATION (BS) FOR PROCESSING PHYSICAL UPLINK SHARED CHANNEL (PUSCH) REPETITIONS BASED ON POWER CONTROL PARAMETERS FOR MULTIPLE TRANSMITTER RECEIVER POINT (mTRP) COMMUNICATION

1010

TRANSMITTING A SOUNDING REFERENCE SIGNAL (SRS) CONFIGURATION TO A USER EQUIPMENT (UE) INDICATING AT LEAST A FIRST SRS RESOURCE SET AND AT LEAST A SECOND SRS RESOURCE SET

1020

TRANSMITTING DOWNLINK CONTROL INFORMATION (DCI) SCHEDULING A FIRST SET OF ONE OR MORE PHYSICAL UPLINK SHARED CHANNEL (PUSCH) REPETITIONS TO A FIRST TRANSMITTER RECEIVER POINT (TRP) AND A SECOND SET OF ONE OR MORE PUSCH REPETITIONS TO A SECOND TRP

1030

PROCESSING AT LEAST ONE OF THE FIRST SET OF PUSCH REPETITIONS BASED ON A FIRST SET OF DEFAULT POWER CONTROL PARAMETERS OR THE SECOND SET OF PUSCH REPETITIONS BASED ON A SECOND SET OF DEFAULT POWER CONTROL PARAMETERS

*FIG. 10*

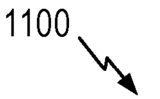

A METHOD BY A USER EQUIPMENT (UE) FOR COMMUNICATING USING POWER CONTROL PARAMETERS FOR MULTIPLE TRANSMITTER RECEIVER POINT (mTRP) PHYSICAL UPLINK SHARED CHANNEL (PUSCH) REPETITION

1110

RECEIVING A SOUNDING REFERENCE SIGNAL (SRS) CONFIGURATION INDICATING AT LEAST A FIRST SRS RESOURCE SET AND AT LEAST A SECOND SRS RESOURCE SET

1120

RECEIVING DOWNLINK CONTROL INFORMATION (DCI) SCHEDULING A FIRST SET OF ONE OR MORE PHYSICAL UPLINK SHARED CHANNEL (PUSCH) REPETITIONS TO A FIRST TRANSMITTER RECEIVER POINT (TRP) AND A SECOND SET OF ONE OR MORE PUSCH REPETITIONS TO A SECOND TRP

1130

TRANSMITTING THE FIRST AND SECOND SETS OF PUSCH REPETITIONS USING AT LEAST ONE OF A FIRST SET OF DEFAULT POWER CONTROL PARAMETERS OR A SECOND SET OF DEFAULT POWER CONTROL PARAMETERS

*FIG. 11*

POWER CONTROL PARAMETERS FOR MULTI-TRP PUSCH REPETITION

CROSS-REFERENCE TO RELATED APPLICATIONS

This application is a national stage application under 35 U.S.C. 371 of PCT/CN2021/093043, filed May 11, 2021, which is hereby expressly incorporated by reference herein in its entirety as if fully set forth below and for all applicable purposes.

INTRODUCTION

Aspects of the present disclosure relate to wireless communications, and more particularly, to techniques for communicating using power control parameters for multiple transmitter receiver point (TRP) physical uplink shared channel (PUSCH) repetition.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects can be implemented in a method for wireless communication performed by a base station (BS). The method generally includes transmitting a sounding reference signal (SRS) configuration to a user equipment (UE) indicating at least a first SRS resource set and at least a second SRS resource set, transmitting downlink control information (DCI) scheduling a first set of one or more physical uplink shared channel (PUSCH) repetitions to a first transmitter receiver point (TRP) and a second set of one or more PUSCH repetitions to a second TRP, and processing at least one of the first set of PUSCH repetitions based on a first set of default power control parameters or the second set of PUSCH repetitions based on a second set of default power control parameters.

Certain aspects can be implemented in a method for wireless communication performed by a user equipment (UE). The method generally includes receiving a sounding reference signal (SRS) configuration indicating at least a first SRS resource set and at least a second SRS resource set, receiving downlink control information (DCI) scheduling a first set of one or more physical uplink shared channel (PUSCH) repetitions to a first transmitter receiver point (TRP) and a second set of one or more PUSCH repetitions to a second TRP, and transmitting the first and second sets of PUSCH repetitions using at least one of a first set of default power control parameters or a second set of default power control parameters.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 4 illustrates physical uplink shared channel power control information that may be provided to a user equipment.

FIG. 10 is a flow diagram illustrating example operations for wireless communication by a base station.

FIG. 11 is a flow diagram illustrating example operations for wireless communication by a user equipment.

DETAILED DESCRIPTION

Aspects of the present disclosure provide apparatuses, methods, processing systems, and computer-readable mediums for communicating using power control parameters for multiple transmitter receiver point (mTRP) physical uplink shared channel (PUSCH) repetition.

Introduction to Wireless Communication Networks

Figure 1:
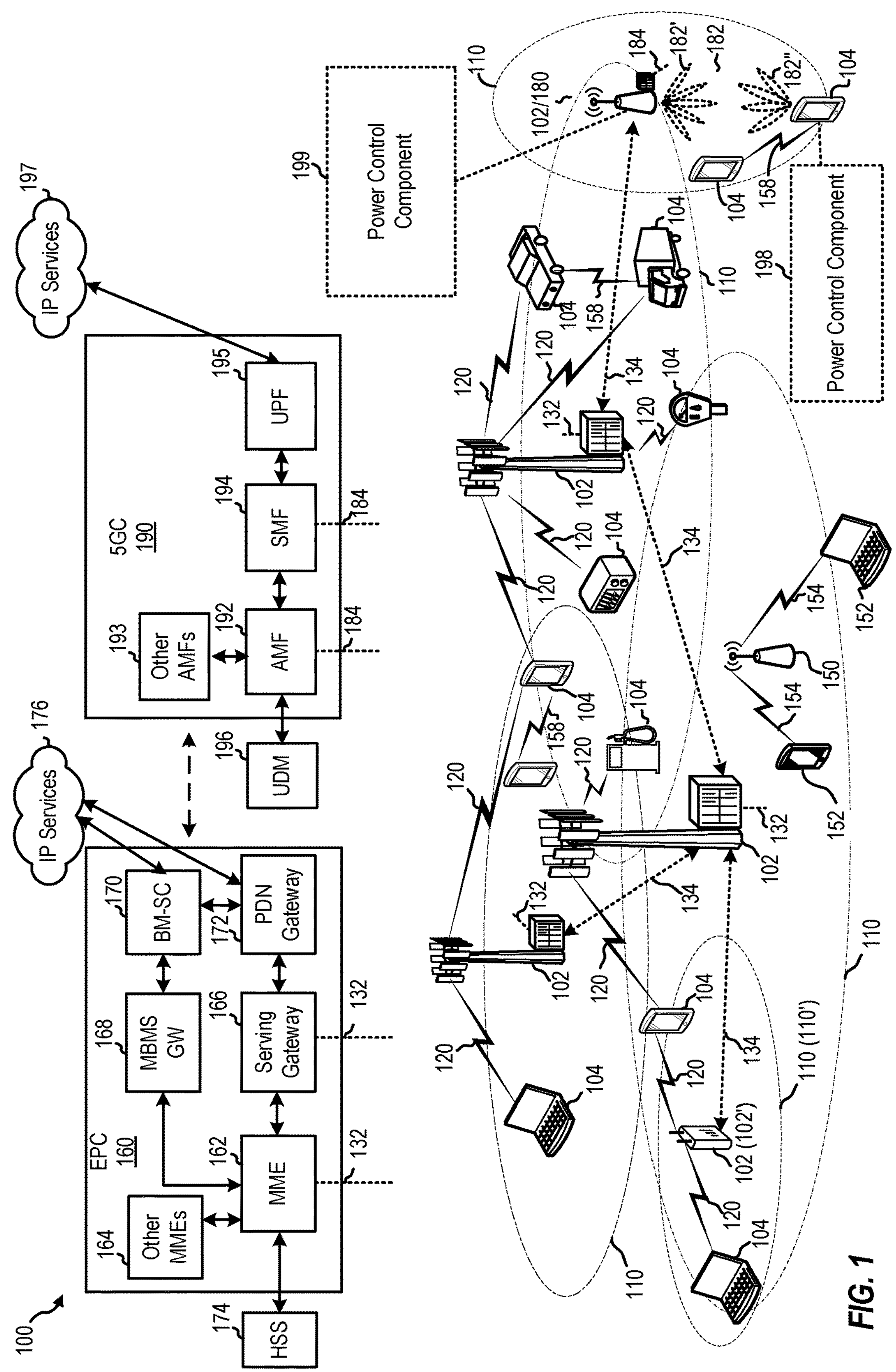
FIG. 1 is a block diagram conceptually illustrating an example wireless communication network.

FIG. 1 depicts an example of a wireless communications network 100, in which aspects described herein may be implemented.

Generally, wireless communications network 100 includes base stations (BSs) 102, user equipments (ULEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, a transceiver function, a transmitter receiver point (TRP), or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 9:
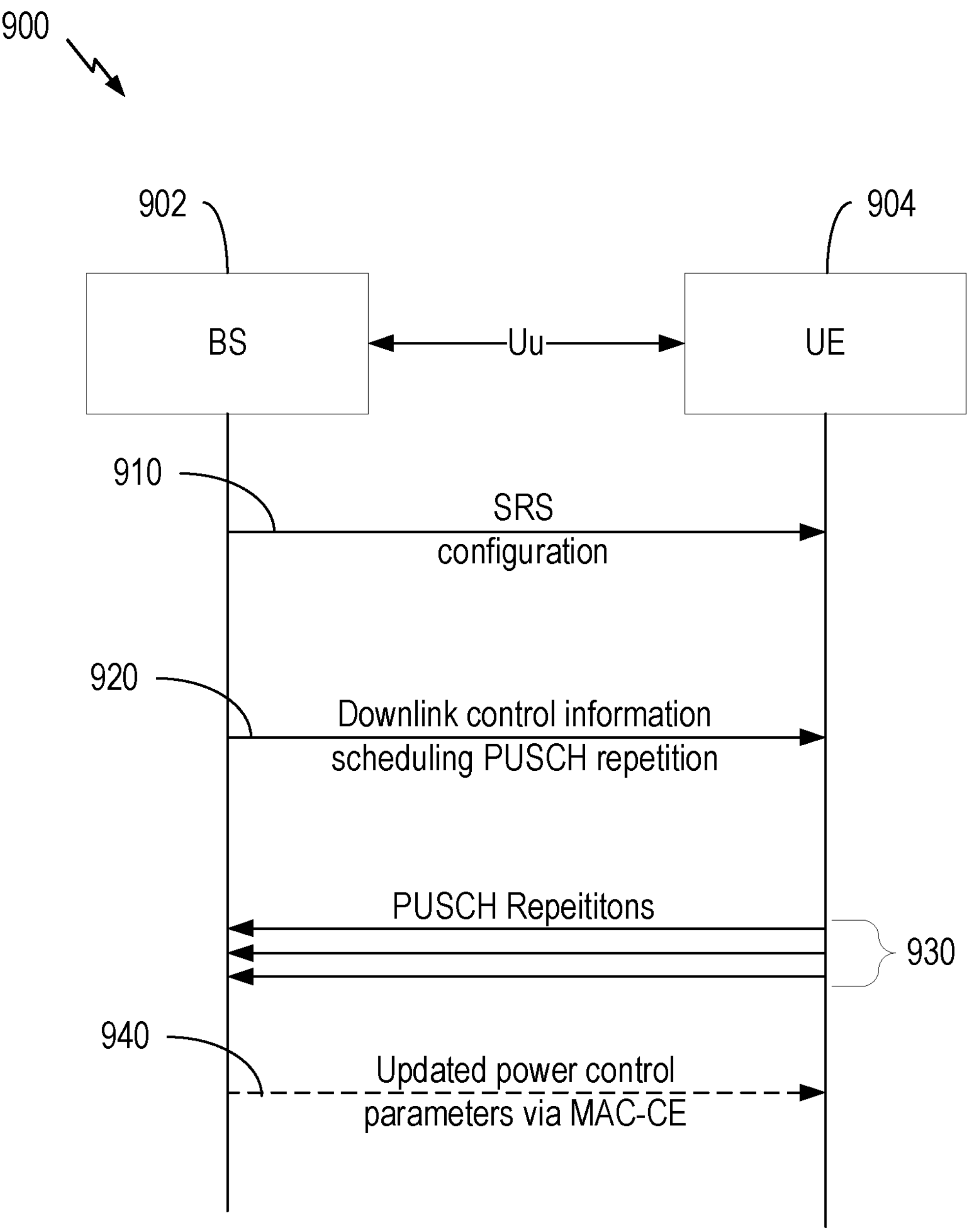
FIG. 9 is a call flow diagram illustrating example operations between a base station and a user equipment for communicating using power control parameters for multiple transmitter receiver point physical uplink shared channel repetition.

Wireless communication network 100 includes a power control component 199, which may be configured to perform the operations in one or more of FIG. 9 or FIG. 10, as well as other operations described herein for processing PUSCH repetitions based on power control parameters for mTRP communication. Wireless communication network 100 further includes a power control component 198, which may be configured to perform the operations in one or more of FIG. 9 or FIG. 11, as well as other operations described herein for communicating using power control parameters for mTRP PUSCH repetition.

Figure 2:
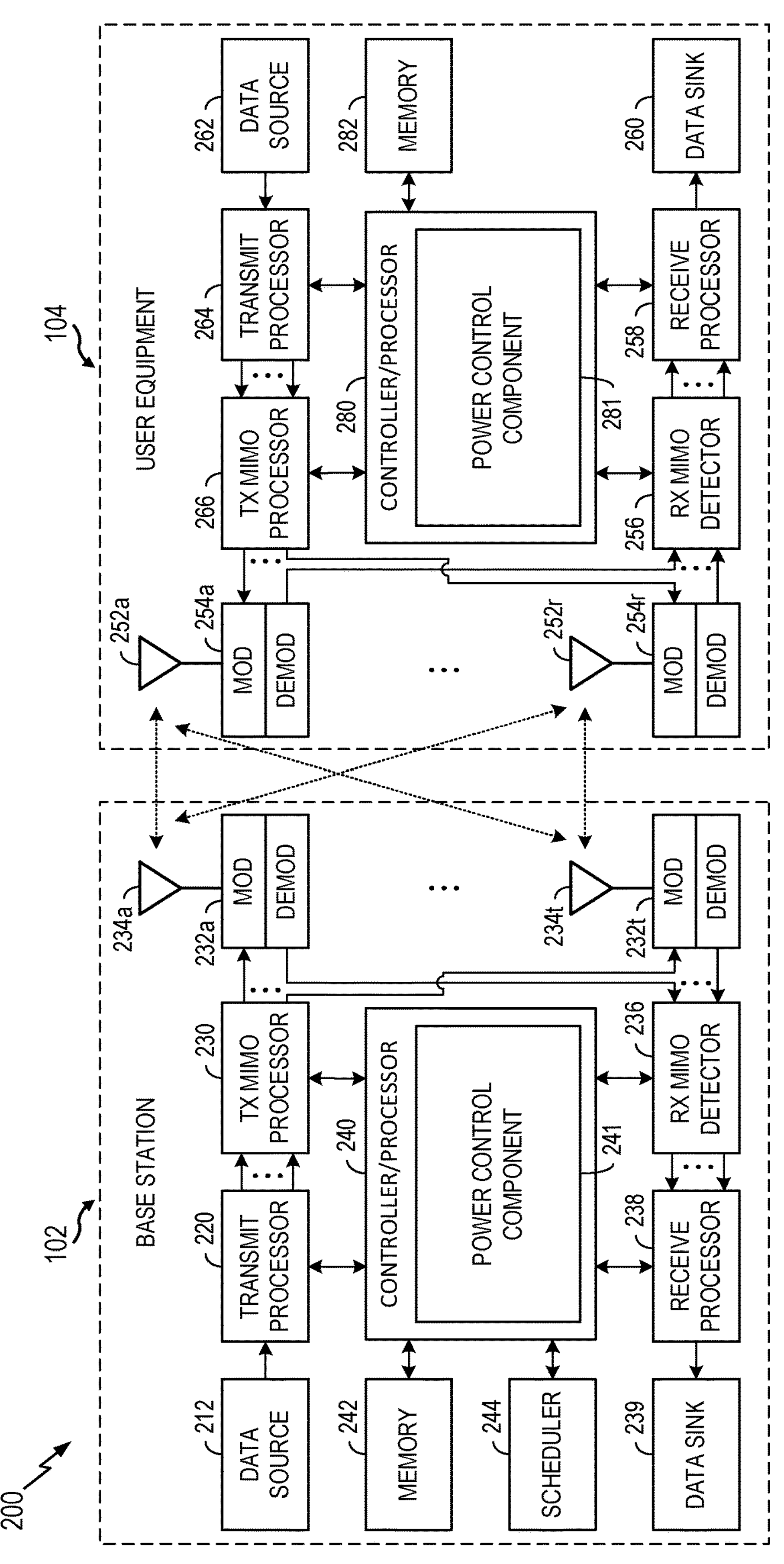
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes power control component 241, which may be representative of power control component 199 of FIG. 1. Notably, while depicted as an aspect of controller/processor 240, power control component 241 may be implemented additionally or alternatively in various other aspects of base station 102 in other implementations. In some cases, the power control component 241 may be configured to perform the operations in one or more of FIG. 9 or FIG. 10, as well as other operations described herein for processing PUSCH repetitions based on power control parameters for mTRP communication.

Generally, user equipment 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., source data 262) and wireless reception of data (e.g., data sink 260).

User equipment 102 includes controller/processor 280, which may be configured to implement various functions related to wireless communications. In the depicted example, controller/processor 280 includes power control component 281, which may be representative of power control component 198 of FIG. 1. Notably, while depicted as an aspect of controller/processor 280, power control component 281 may be implemented additionally or alternatively in various other aspects of user equipment 104 in other implementations. In some cases, the power control component 281 may be configured to perform the operations in one or more of FIG. 9 or FIG. 11, as well as other operations described herein for communicating using power control parameters for mTRP PUSCH repetition.

Figures 3A, 3B, 3C, 3D:
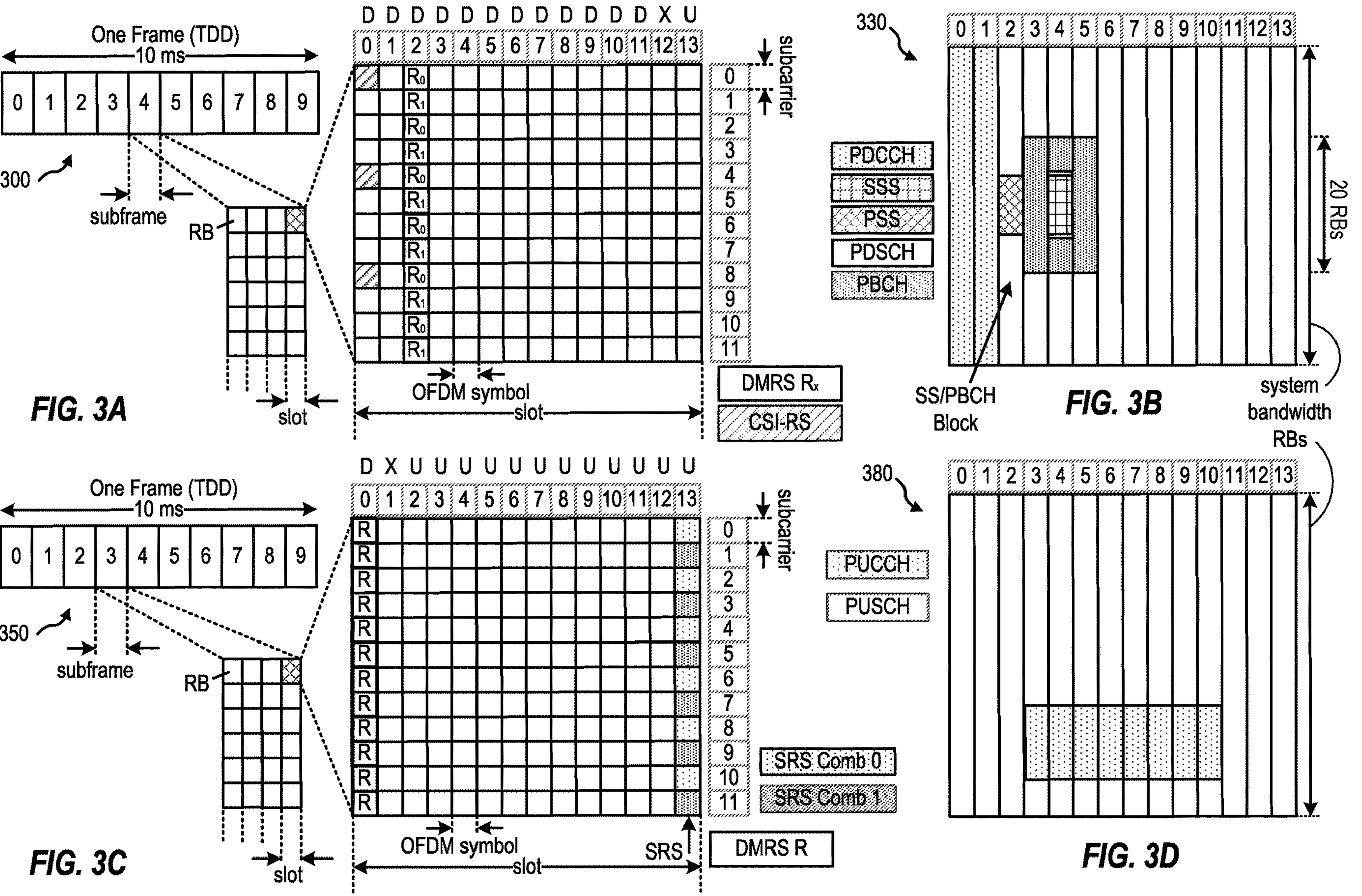
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example PUSCH Power Control

When communicating within a wireless communication system, such as the wireless communication network 100 of FIG. 1, uplink data may be sent by a user equipment (UE) to the network (e.g., via a base station (BS)) or transmitter receiver point (TRP) on a physical uplink shared channel (PUSCH). When transmitting on PUSCH, the UE may first determine a transmission power at which to send uplink data on PUSCH such that the uplink data may be correctly received by the base station. The UE may determine the transmission power based on PUSCH power control information received from the BS. The PUSCH power control information may include one or more power control parameters, as discussed below, for determining the PUSCH transmission power. In some cases, the UE may use Equation 1, below, to determine the transmission power for PUSCH.

$$P_{PUSCH,b,f,c}(i,j,q_d,l)=\min\begin{cases}P_{CMAX,f,c}(i),\\ P_{O_{PUSCH},b,f,c}(j)+10\log_{10}(2^{\mu}\cdot M_{RB,b,f,c}^{PUSCH}(i))+\\ \alpha_{b,f,c}(j)\cdot PL_{b,f,c}(q_d)+\Delta_{TF,b,f,c}(i)+f_{b,f,c}(i,l)\end{cases} \quad \text{(Eq. 1)}$$

In Equation 1, i is the transmission occasion associated with the PUSCH, j is the parameter set index, $q_d$ is the reference signal (RS) index for an active downlink (DL) bandwidth part (BWP), l is the PUSCH power control state index, and $P_{CMAX,f,c}(i)$ is a maximum transmission power for PUSCH. The remaining portion of Equation 1 is composed of various factors for open loop power control and closed loop power control. The open loop power control factors include $$P_{O_{PUSCH},b,f,c}(j),\ 2^{\mu},\ M_{RB,b,f,c}^{PUSCH}(i),\ \alpha_{b,f,c}(j),\ PL_{b,f,c}(q_d),\ \text{and}\ \Delta_{TF,b,f,c}(i).$$

Specifically, $P_{O_{PUSCH},b,f,c}(j)$ is a factor for controlling a received power level (e.g., at a BS), $2^{\mu}$ is the subcarrier spacing, $$M_{RB,b,f,c}^{PUSCH}(i)$$

is the bandwidth of the PUSCH resource assignment expressed in number of resource blocks, $\alpha_{b,f,c}(j)$ (e.g., "alpha") is a partial path loss compensation factor, $PL_{b,f,c}(q_d)$ is the path loss measured based on a PL-RS with index $q_d$, and $\Delta_{TF,b,f,c}(i)$ is a transmission formation/modulation and coding scheme. Additionally, $f_{b,f,c}(i, l)$ is the closed loop PUSCH power control adjustment state, which may be determined based on a transmit power control (TPC) command (e.g., received from the base station) with loop index 1.

The open loop power control and closed loop power control factors may be determined based on one or more configured uplink (UL) power control parameters. For example, a first UL power control parameter within the PUSCH power control information, twoPUSCH-PC-AdjustmentStates, defines whether there are separate loops or states for the closed loop power control. For example, if the parameter twoPUSCH-PC-AdjustmentStates is configured, the closed loop power control may have two separate states; otherwise, there may only be one state for the closed loop power control. When configured with two states, TPC commands may be applied separately for the two different states/loops.

Additionally, a set of P0 and alpha (α) values for open loop power control may be configured in the PUSCH power control information in the information element (IE), p0-AlphaSets, where each member in a set has an identifier (ID) specified by the parameter p0-PUSCH-AlphaSetId which may include a value between 0 and 29. Additionally, a list of path loss reference RS may be configured, where each member of the list has an ID specified by the parameter pusch-PathlossReferenceRS-Id, which may include a value between 0 and 3.

Additionally, a list of sounding reference signal resource indicator (SRI) to PUSCH (SRI-PUSCH) mappings (e.g., SRI-PUSCH-Mapping), where each member of the list has an ID specified by the parameter sri-PUSCH-PowerControlId, which may include a value between 0 and 15. Further, each member of the SRI-PUSCH mappings list may be configured as shown in FIG. 4.

For example, FIG. 4 illustrates PUSCH power control information 400 that may be provided by the network to the UE. As shown at 402, the PUSCH power control information 400 may include a list of SRI to PUSCH mappings. For each member of the list, the PUSCH power control information 400 may include several SRI-PUSCH power control parameters as illustrated at 404 included within an SRI-PUSCH power control information element 403. For example, each member of the list includes an ID parameter (e.g., sri-PUSCH-PowerControlId) for identifying the SRI-PUSCH mapping. Additionally, each member of the list includes parameters for identifying a path loss RS (PL RS) (e.g., sri-PUSCH-PathlossReferenceRS-Id), a P0 and alpha (e.g., sri-PUSCH-AlphaSetId), and a closed loop index (e.g., sri-PUSCH-ClosedLoopIndex). In some cases, sri-PUSCH-PowerControlId may be used as a codepoint of an SRI field in downlink control information (DCI) that schedules PUSCH. If the value of the SRI field in the DCI that schedules the PUSCH is x, then the uplink power control parameters (e.g., PL RS, P0 and alpha, closed loop index) corresponding to sri-PUSCH-PowerControlId=x is used for PUSCH transmission. In other words, the UE may look at a value SRI field in the DCI. The value of the SRI field may be taken as a the value for sri-PUSCH-PowerControlId, which indicates to the UE the corresponding PL RS, P0 and alpha, and closed loop index. In some cases, the SRI field can be up to 4 bits (e.g., up to 16 values of x can be indicated) depending on different configurations.

Power Control Parameters for Power Boosting

Figure 5:
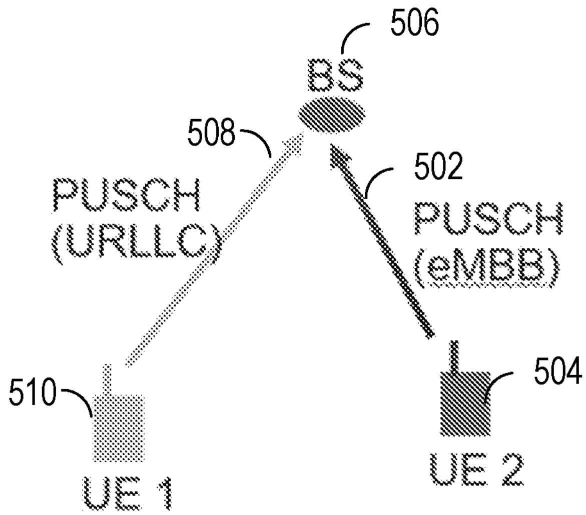
FIG. 5 illustrates an example of power boosting in a wireless communication network.

In some cases, the uplink power control parameter P0 may be modified to control open loop power for ultra-reliable low latency communications (URLLC) in case of collision between transmissions of two different UEs. For example, as illustrated in FIG. 5, there may be cases where lower priority traffic 502 (e.g., enhanced Mobile Broadband (eMBB) traffic on PUSCH) may be scheduled for a second UE 504 for transmission to a BS 506 prior to higher priority traffic 508 (e.g., URLLC traffic on PUSCH) arriving at a first UE 510 for transmission to the BS 506, preventing the assignment of resources for this higher priority traffic. In such cases, rather than preventing the scheduling of this higher priority traffic, the BS 506 may instead transmit DCI that schedules the first UE 510 with a modified P0 to boost the power for the higher priority URLLC traffic. Boosting the power for the higher priority traffic may help the BS 506 to receive the higher priority traffic even in view of the collision with the lower priority traffic.

Figure 6:
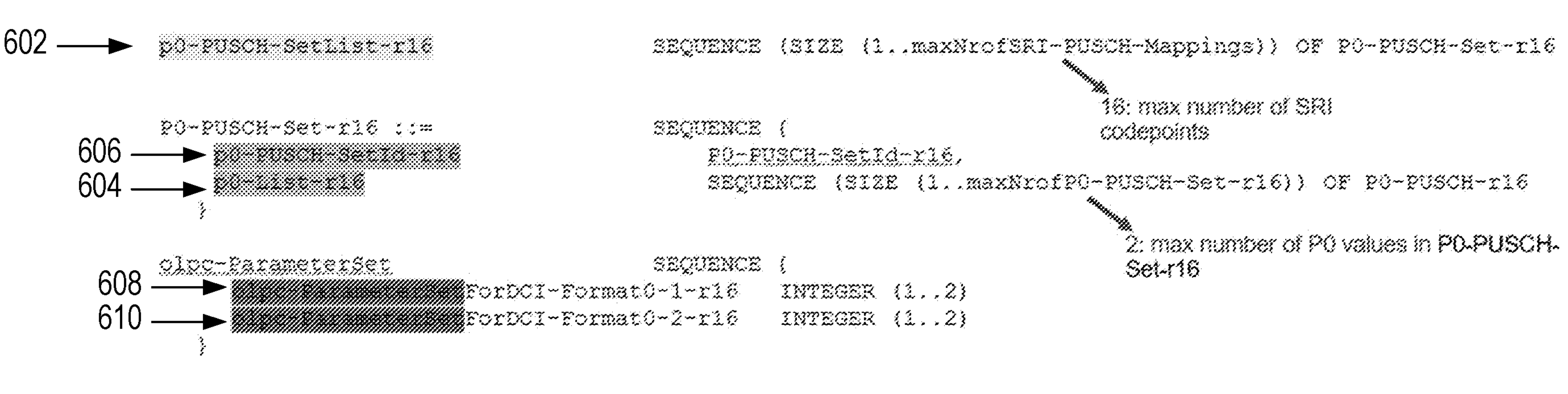
FIG. 6 illustrates physical uplink shared channel power control information for configuring an open-loop power control parameter set indication field.

The manner in which this power boosting (e.g., modified P0) is configured may depend on a DCI format and SRI. For example, DCI format 0-1 or 0-2 can be configured with an open-loop power control (OLPC) parameter set indication field. In some cases, the presence of this OLPC parameter set indication field may depend on one or more parameters in the PUSCH power control information. FIG. 6 provides an example of the PUSCH power control information 600 that may configure the OLPC parameter set indication field. For example, the OLPC parameter set indication field is present in DCI if the radio resource control (RRC) parameter p0-PUSCH-SetList-r16, as shown at 602, is configured; otherwise, the field is zero bits.

Further, if SRI field is present in the DCI, the OLPC parameter set indication field is one bit and RRC parameter p0-List-r16, as illustrated at 604 in the PUSCH power control information 600, contains one value (e.g., one P0 value). If the OLPC parameter set indication field is set to 0, the SRI field value in DCI maps to sri-PUSCH-PowerControlId of the PUSCH power control information 400 from which P0 (and other uplink power control parameters are determined). In this case, there may be no power boost. If, however, the OLPC parameter set indication field is set to 1, SRI field value in DCI maps to p0-PUSCH-SetId-r16 illustrated at 606 in the PUSCH power control information 600 from which P0 is determined. The determined P0 may be a first value in P0-PUSCH-Set-r16 with a p0-PUSCH-SetId-r16 value mapped to the SRI field value. This case corresponds to using a different P0 value for open loop power control (e.g. power boost).

In some cases, if the SRI field is not present in the DCI, the OLPC parameter set indication field is either one bit or two bits depending on the RRC parameter olpc-ParameterSet, which may be separately configurable for DCI format 0-1 and 0-2 as illustrated at 608 and 610. Accordingly, if the OLPC parameter set indication field is 0 or 00, P0 may be determined from a first P0-PUSCH-AlphaSet in p0-AlphaSets of the PUSCH power control information 400. In this case, there may be no power boost. If, however, the OLPC parameter set indication field is 1 or 01, P0 may be determined from a first value in P0-PUSCH-Set-r16 with the lowest p0-PUSCH-SetID-r16 value (e.g. a first power boost value) illustrated at 606. Further, if the OLPC parameter set indication field is 10, P0 may be determined from a second value in P0-PUSCH-Set-r16 with the lowest p0-PUSCH-SetID-r16 value (e.g. a second power boost value when the field is 2 bits).

Default Power Control Parameters for PUSCH for Single TRP Communication

In 5G Release 15 and 16, there are various rules for defining default power control parameters (e.g., P0, alpha (α), PL-RS, and closed loop index) for PUSCH transmission for single TRP communication in the absence of SRI field for DCI formats other than DCI format 0_0, such as DCI formats 0_1 and 0_2. In some cases, these default power control parameters may be for a single transmitter receiver point (TRP) scenario (e.g., the UE is only communicating with one TRP).

In some cases, default values for P0 and alpha, may be determined from the value of the first P0-PUSCH-AlphaSet in p0-AlphaSets. Further, a default value for PL-RS may be determined in different manners. For example, if the UE is provided enableDefaultBeamPL-ForSRS and is not provided PUSCH-PathlossReferenceRS and PUSCH-PathlossReferenceRS-r16, the UE uses the same RS resource index $q_d$ as for an SRS resource set with an SRS resource associated with the PUSCH transmission. If SRI-PUSCH-PowerControl is not provided to the UE, the UE determines a RS resource index $q_d$ with a respective PUSCH-PathlossReferenceRS-Id value being equal to zero. In other cases, an RS resource index $q_d$ may be determined by the UE from the PUSCHPathlossReferenceRS-Id mapped to sri-PUSCH-PowerControlId=0

Further, for a default value for the closed loop index, if the PUSCH transmission is scheduled by a DCI format that does not include an SRI field, or if an SRI-PUSCH-PowerControl is not provided to the UE, 1=0.

PUSCH Repetition

In Release 17, one objective is to improve reliability and robustness for PUSCH for multi-TRP (mTRP) and/or multi-panel scenarios. Multi-TRP is a technique in which a UE may communicate with multiple TRPs. In some cases, if PUSCH transmission by a UE to a first TRP/panel is blocked, a repetition of the PUSCH transmission may be transmitted to, and decoded by, another TRP/panel, increasing transmission diversity. These techniques may be known as PUSCH repetition.

There are two types of PUSCH repetition: type A and type B. Type A PUSCH repetition involves transmitting different PUSCH transmission occasions (i.e. repetitions) corresponding to a same transport block (TB) in different slots. Type B PUSCH repetition involves transmitting different PUSCH transmission occasions (i.e. repetitions) corresponding to a same transport block (TB) in different mini-slots. The number of PUSCH repetitions can be RRC configured or can be indicated dynamically through time domain resource assignment (TDRA) field of DCI. Further, all the PUSCH repetitions are transmitted by the UE with a same transmit beam (e.g., the SRI field of the DCI is applied to all the repetitions). For example, the SRI is a field in UL DCI that specifies the beam/power control for PUSCH by pointing to one or more SRS resources within a SRS resource set.

However, when different PUSCH repetitions are intended to be received at different TRPs/panels/antennas at the BS side, a same transmit beam for all the repetitions may be not optimal. Thus, in some cases, PUSCH repetitions can belong to two SRS resource sets, each SRS resource set having a different corresponding transmit beam and power control parameters. To achieve this, two sets of PUSCH repetitions may correspond to two SRS resource sets. For example, DCI may indicate two transmit beams and two sets of power control parameters by indicating one or more SRS resources within each of the two SRS resource sets.

Dynamic Order Switching

Figures 7A, 7B, 7C:
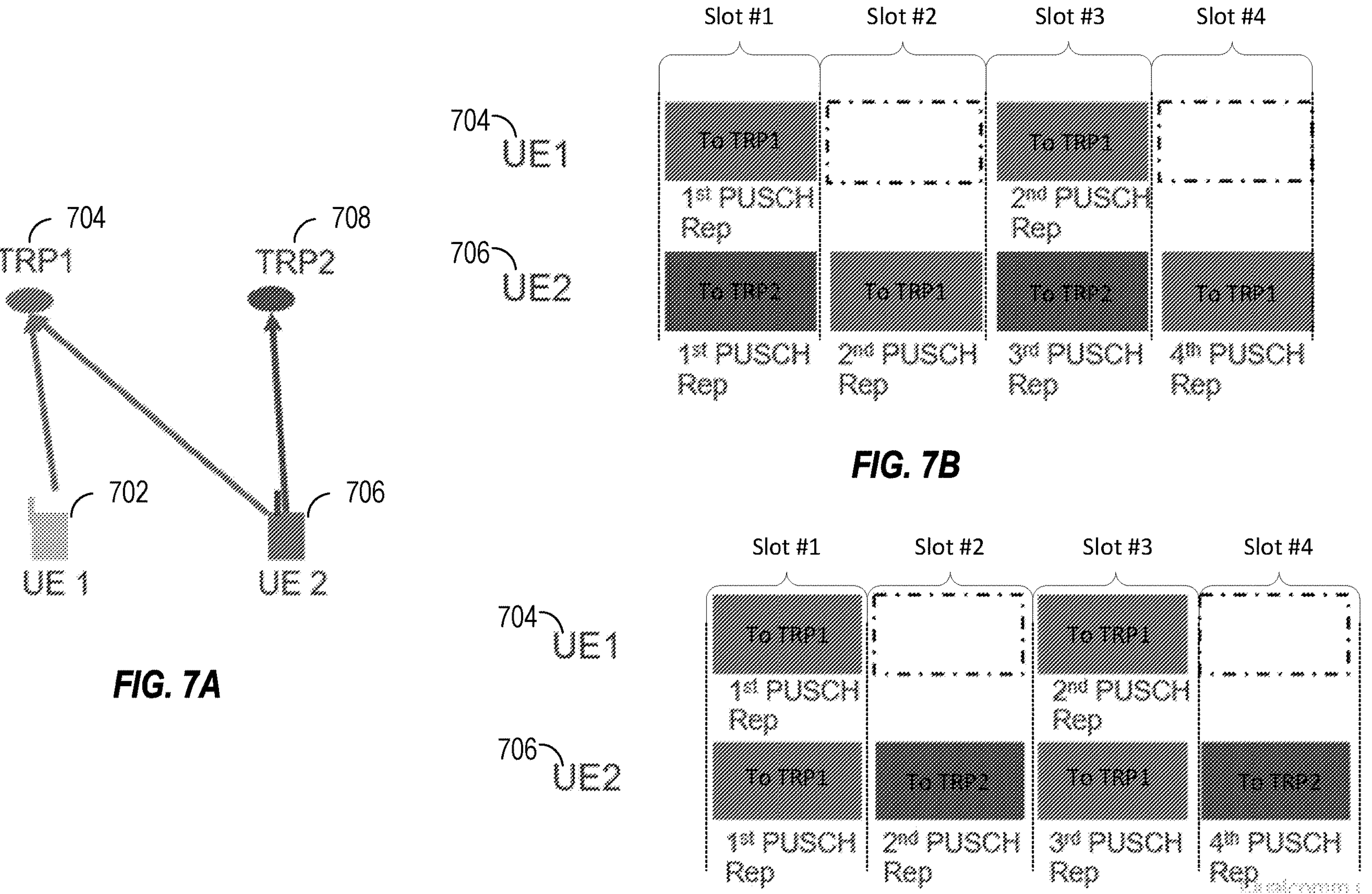
FIGS. 7A, 7B, and 7C illustrate examples of dynamic order switching related to physical uplink shared channel repetition.

In some cases, an order in which PUSCH repetitions may be transmitted to a particular TRP may be different for different UEs. For example, in some cases, a first UE may be configured to transmit to the particular TRP first while a second UE may be configured to first transmit to another TRP and to transmit to the particular TRP second. Such configuration may cause issues with scheduling for different UEs. FIGS. 7A and 7B provides an illustration of this scheduling issue.

For example, as shown in FIG. 7A, a first UE 702 (e.g., UE1) may be configured to communicate with a first TRP 704 (e.g., TRP1). Additionally, a second UE 706 may be configured to communicate with the first TRP 704 and a second TRP 708. The first UE 702 may be configured to communicate (e.g., PUSCH transmission) with the first TRP 704 using a first transmit beam and first set of power control parameters associated with the first UE 702. Similarly, the second UE 706 may also be configured to communicate (e.g., PUSCH transmission) with the first TRP 704 using a first transmit beam and first set of power control parameters associated with the second UE 706. Further, the second UE 706 may also be configured to communicate (e.g., PUSCH transmission) with the second TRP 708 using a second transmit beam and second set of power control parameters associated with the second UE 706.

In some cases, the first UE 702 may be first scheduled to transmit a PUSCH repetition to the first TRP 704 first while the second UE 704 is first scheduled to transmit a PUSCH repetition to a second TRP 708 (e.g., during the transmission of the PUSCH repetition of the first UE 702 to the first TRP 704), which may cause issues with scheduling at the first TRP 704, as illustrated in FIG. 7B. For example, as shown in FIG. 7B, the first UE 702 is scheduled to transmit a first PUSCH repetition to the first TRP 704 in slot #1 and a second PUSCH repetition to the first TRP 704 in slot #3 using the first transmit beam and first set of power control parameters. Additionally, as shown in FIG. 7B, the second UE 706 is scheduled to transmit a first PUSCH repetition to the second TRP 710 in slot #1 using the second transmit beam and second set of power control parameters, a second PUSCH repetition to the first TRP 704 in slot #2 using the first transmit beam and first set of power control parameters, a third PUSCH repetition to the second TRP 710 in slot #3, and a fourth PUSCH repetitions to the first TRP 704 in slot #4.

As can be seen in FIG. 7, this manner of scheduling PUSCH repetitions results in a cyclic PUSCH scheduling pattern between UEs in which PUSCH repetition transmission to the first TRP 704 (e.g., using the first transmit beam and first set of power control parameters) occurs in all slots. This cyclic PUSCH scheduling pattern may be undesirable as it may prevent the first TRP 704 from scheduling a third UE within slot #2 and slot #4 using other transmit beams. To resolve this issue, dynamic order switching may be used to dynamically switch an order in which a UE transmits PUSCH repetitions to a particular TRP.

FIG. 7C provides an illustration of dynamic order switching. For example, similar to FIG. 7B, in FIG. 7C the first UE 702 is scheduled to transmit a first PUSCH repetition to the first TRP 704 in slot #1 and a second PUSCH repetition to the first TRP 704 in slot #3 using the first transmit beam and first set of power control parameters. However, unlike FIG. 7B, dynamic order switching may be applied to the second UE 706 to switch the order in which the second UE 706 transmits PUSCH repetitions to the first TRP 704 and second TRP 708. For example, after dynamic order switching is configured, the second UE 706 is scheduled to transmit a first PUSCH repetition to the first TRP 704 in slot #1 using the first transmit beam and first set of power control parameters and to transmit a second PUSCH repetition to the second TRP 710 in slot #2 using the second transmit beam and second set of power control parameters, and so on. As such, the PUSCH repetition transmissions for the first UE 702 and second UE 706 may occur in a same slot, preventing the cyclic PUSCH repetition pattern and allowing the first TRP 704 to schedule a third UE within slot #2 and slot #4 using other transmit beams.

Aspects Related to Power Control Parameters for Multi-TRP PUSCH Repetition

In 5G Release 17, power control for mTRP PUSCH involve the use of two sets of power control parameters for two different TRPs. In such cases, two SRI fields (e.g., indicating two SRS resource sets) within DCI may be used and each codepoint of the two SRI fields may be mapped to one set of power control parameters (e.g., one SRI-PUSCH-PowerControl). In other words, each codepoint of the two SRI fields may be mapped to one set of power control parameters for PUSCH repetition transmission, including P0, alpha, PL-RS resource index ($q_d$), and closed loop index.

Figure 8:
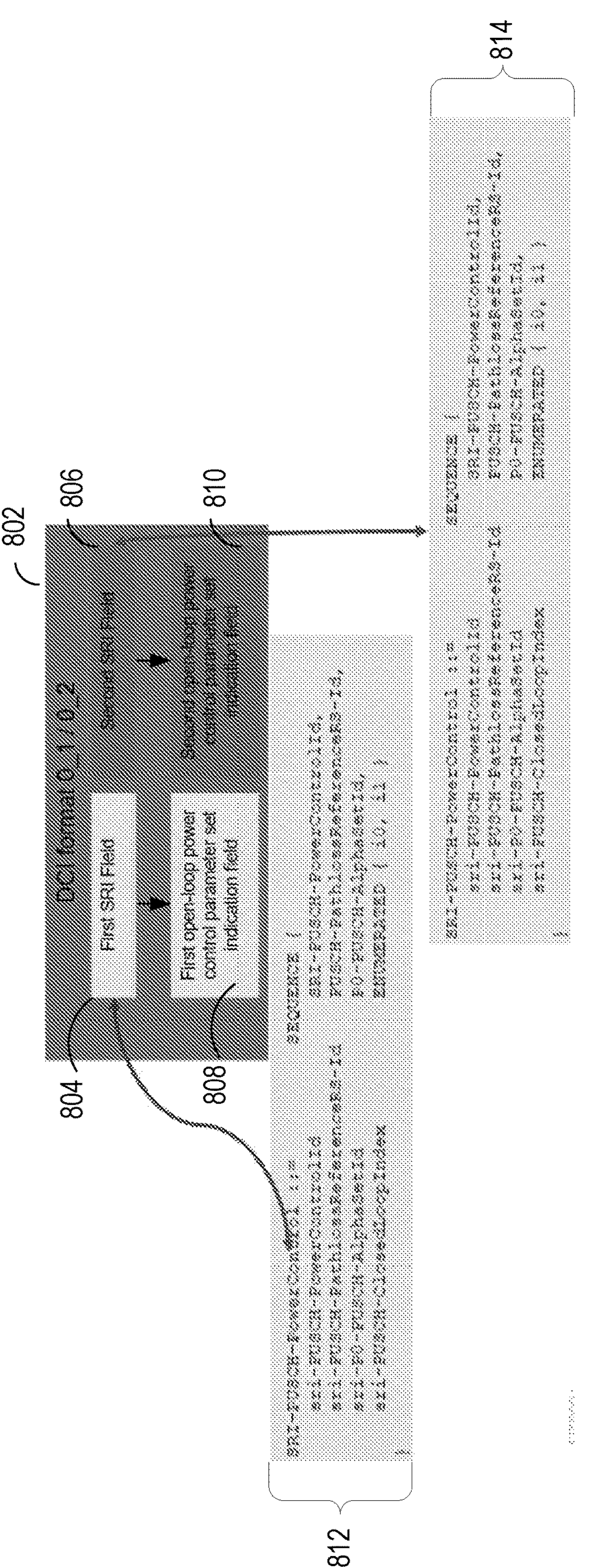
FIG. 8 illustrates a mapping of sounding reference signal resource indicator fields to power control parameters for physical uplink shared channel repetition.

FIG. 8 illustrates the mapping of the two SRI fields to separate sets of power control parameters for an mTRP configuration for PUSCH repetition transmission. For example, as illustrated in FIG. 8, a UE (e.g., UE 104 of FIG. 1) may receive a DCI 802. The DCI 802 may be a DCI format 0_1 or 0_2 and may include a first SRI field 804 and a second SRI field 806. The first SRI field 804 may map to a first set of uplink power control parameters 808 for a first TRP for PUSCH repetition transmission to the first TRP, as discussed above. Similarly, the second SRI field 806 may to a second set of uplink power control parameters 810 for a second TRP for PUSCH repetition transmission to the second TRP. As shown, the first set of uplink power control parameters 808 may include a first P0, a first alpha, a first PL-RS resource index, and a first closed loop index as illustrated at 812, each of which may be identified based on a value of the first SRI field 804. Similarly, the second set of uplink power control parameters 810 may include a second P0, a second alpha, a second PL-RS resource index, and a second closed loop index as illustrated at 814, each of which may be identified based on a value of the second SRI field 806.

However, if one or both of the SRS resource sets indicated by the SRI contain only one SRS resource, the DCI may lack any SRI fields, which may cause issues with determining what power control parameters to use for PUSCH transmission. For example, if one or both of the SRS resource sets include only one SRS resource, the DCI 802 may lack the first SRI field 804 and/or the second SRI field 806. As such the UE would not have the SRI value in order to determine the uplink power control parameters for PUSCH repetition transmission, which are dependent on the SRI value. That is, the UE would not be able to determine the correct SRI-PUSCH-PowerControl that indicates the uplink power control parameters without using SRI. As such, the UE may not be able to determine a transmission power for PUSCH repetition transmission to one or more TRPs in the mTRP configuration.

Therefore, aspects of the present disclosure provide techniques to help alleviate issues with determining uplink power control parameters for PUSCH transmission in a mTRP configuration when DCI (e.g., that schedules the PUSCH repetition transmission) lacks an SRI field (e.g., in cases where a corresponding SRS resource set includes only one SRS resource). For example, aspects of the present disclosure provide techniques for determining one or more default sets of power control parameters to use for transmitting PUSCH repetitions to a plurality of TRPs when a DCI that schedules the PUSCH repetitions lacks an SRI field.

Example Call Flow Illustrating Operations for Communicating Using Power Control Parameters for mTRP PUSCH Repetition FIG. 9 is a call flow diagram illustrating example operations 900 between a BS 902 and a UE 904 for communicating using power control parameters for mTRP PUSCH repetition. In some cases, the BS 702 may be an example of the BS 102 in the wireless communication network 100 illustrated in FIG. 1 and may include or be associated with multiple TRPs, such as a first TRP and/or a second TRP. Additionally, the UE 704 may be an example of the UE 104 illustrated in FIG. 1 and may be configured to communicate with the multiple TRPs. Further, as shown, a Uu interface may be established to facilitate communication between the BS 702 and UE 704, however, in other aspects, a different type of interface may be used.

As shown, the operations 900 illustrated in FIG. 9 begin at 910 with the BS 902 transmitting a sounding reference signal (SRS) configuration to the UE 904 indicating at least a first SRS resource set and at least a second SRS resource set. In some cases, the BS 902 may transmit the SRS configuration to the UE 904 using at least one of the first TRP or the second TRP.

At 920, the BS 902 transmits downlink control information (DCI) to the UE 904 that schedules a first set of one or more physical uplink shared channel (PUSCH) repetitions to the first TRP and a second set of one or more PUSCH repetitions to the second TRP. The BS 902 may transmit the DCI to the UE 904 using at least one of the first TRP or the second TRP.

Thereafter, as illustrated at 930, the LIE 904 transmits the first and second sets of PUSCH repetitions using at least one of a first set of default power control parameters or a second set of default power control parameters. In some cases, the first and second sets of default power control parameters comprise one or more of: a first parameter for controlling received power level, a second parameter for partial path loss compensation, a third parameter indicating a reference signal (RS) resource index for measuring path loss, and a closed loop index.

As shown, the BS 902 receives the first and second sets of PUSCH repetitions at 930 (e.g., via the first TRP and second TRP) and may thereafter process at least one of the first set of PUSCH repetitions based on a first set of default power control parameters or the second set of PUSCH repetitions based on a second set of default power control parameters.

In some cases, at least one of the first SRS resource set or the second SRS resource set received at 910 by the UE 904 in the SRS configuration may be configured with only one SRS resource. In such cases, the DCI received at 920 by the UE 904 may comprise a DCI format 0_1 or 0_2 and may lack a sounding reference signal resource indicator (SRI) field that would allow the UE 904 to determine the first and second sets of power control parameters using traditional methods described above. Accordingly, when the UE is configured for multi-TRP communication (e.g., communication to the first TRP and second TRP) and when the UE 904 receives a DCI lacking SRI fields, the UE 904 may determine the first and second sets of power control parameters according to different options.

Aspects Related to Determining Default Power Control Parameters when an SRI Field is not Provided and when an SRI PUSCH Power Control Field has an ID of Zero In some cases, the UE 904 may use a first option for determining the first and second sets of power control parameters when the DCI lacks an SRI field, when a first SRI PUSCH power control information element with ID equal to zero (e.g., sri-PUSCH-PowerControlId=0) is associated with the first SRS resource set, and when a second SRI PUSCH power control information element with ID equal to zero (e.g., sri-PUSCH-PowerControlId=0) is associated with the second SRS resource set.

In some cases, the first set of default power control parameters may be determined by the UE 904 based on a mapping to the first SRI PUSCH power control information element with ID equal to zero. For example, the UE 904 may determine a first P0 and a first alpha, a first PL-RS resource index, and a first closed loop index from sri-P0-PUSCH-AlphaSetId, sri-PUSCH-PathlossReferenceRS-Id, and sri-PUSCH-ClosedLoopIndex, respectively, mapped to the first sri-PUSCH-PowerControlId=0 associated with the first SRS resource set.

For example, the UE 904 may receive PUSCH power control information from the BS 902, such as the PUSCH power control information illustrated at 812 in FIG. 8, which includes the power control parameters sri-P0-PUSCH-AlphaSetId, sri-PUSCH-PathlossReferenceRS-Id, and sri-PUSCH-ClosedLoopIndex. The UE 904 may then determine the first P0 and alpha power control parameters from the sri-P0-PUSCH-AlphaSetId in the PUSCH power control information that maps to the first SRI PUSCH power control information element with ID equal to zero (e.g., the first sri-PUSCH-PowerControlId=0). Likewise, the UE 904 may determine the first PL-RS resource index power control parameter from sri-PUSCH-PathlossReferenceRS-Id in the PUSCH power control information that maps to the first SRI PUSCH power control information element with ID equal to zero (e.g., the first sri-PUSCH-PowerControlId=0). Additionally, the UE 904 may determine the first closed loop index power control parameter from sri-PUSCH-ClosedLoopIndex in the PUSCH power control information that maps to the first SRI PUSCH power control information element with ID equal to zero (e.g., the first sri-PUSCH-PowerControlId=0).

Likewise, the second set of default power control parameters may be determined by the UE 904 based on a mapping to the second SRI PUSCH power control information element with ID equal to zero. For example, the UE 904 may determine a second P0 and a second alpha, a second PL-RS resource index, and a second closed loop index from sri-P0-PUSCH-AlphaSetId, sri-PUSCH-PathlossReferenceRS-Id, and sri-PUSCH-ClosedLoopIndex, respectively, mapped to the second sri-PUSCH-PowerControlId=0 associated with the second SRS resource set. For example, the UE 904 may receive PUSCH power control information from the BS 902, such as the PUSCH power control information illustrated at 814 in FIG. 8, which includes the power control parameters sri-P0-PUSCH-AlphaSetId, sri-PUSCH-PathlossReferenceRS-Id, and sri-PUSCH-ClosedLoopIndex from which the UE 904 may determine the second P0 and the second alpha, the second PL-RS resource index, and the second closed loop index.

In some cases, whether to use the first set of default power control parameters, the second set of default power control parameters, or both the first and second sets of default power control parameters may depend on a field in the DCI for dynamic order switching. For example, as noted above, in certain cases, a BS (e.g., BS 902) may dynamically switch an order in which a UE (e.g., UE 904) is to transmit PUSCH repetitions to TRPs. In other words, the field in the DCI indicates a dynamic switch in an order of which TRPs are targeted by which PUSCH repetition. In such cases, the UE 904 may decide, based on a field in the DCI, whether to use the first set of default power control parameters, the second set of default power control parameters, or both the first and second sets of default power control parameters.

For example, in some cases, the BS 902 may provide an indication in the DCI that indicates to the UE to switch an order of the PUSCH repetitions in one or more slots, such as switching the PUSCH repetition transmission within a first slot to the first TRP from the second TRP. In such cases, instead of the UE 904 using the second set of default power control parameters to transmit a PUSCH repetition to the second TRP in the first slot, the UE 904 may transmit the PUSCH repetition to the first TRP in the first slot using the first set of default power control parameters (e.g., based on the dynamic order switching indication in the DCI).

In some cases, one or more of the power control parameters (e.g., P0, alpha, PL-RS resource index, closed loop index) in the first and second sets of default power control parameters may be updated by the BS 902. For example, as illustrated at 940 in FIG. 9, the BS 902 may optionally transmit a media access control-control element (MAC-CE) to the UE 904 that includes updated power control parameters for at least one of the first set of default power control parameters or the second set of default power control parameters. As an example, the updated power control parameters may include a PL-RS resource index associated with the at least one of first set of default power control parameters (e.g., associated with the first sri-PUSCH-PowerControlId=0) or the second set of default power control parameters (e.g., associated with the second sri-PUSCH-PowerControlId=0).

In certain cases, the techniques for determining the first and second sets of default power control parameters according to the first option may also apply to modifications in the default power control parameters for power boosting. For example, as discussed above with respect to FIG. 6, in certain cases, power boosting may be performed by modifying open loop power control parameters, such as P0. Such modification may be indicated based on an open loop power control (OLPC) parameter set indication field within PUSCH power control information, such as the PUSCH power control information 600. In some cases, a first OLPC parameter set indication field may be associated with the first set of default power control parameters and a second OLPC parameter set indication field may be associated with the second set of default power control parameters.

For example, if a value of the first OLPC parameter set indication field is set to a certain value, a value for a first parameter for controlling received power level (e.g., P0) in the first set of default power control parameters is assumed. Additionally, if a value of the second OLPC parameter set indication field is set to a certain value, a value for a first parameter for controlling received power level in the second set of default power control parameters is assumed. More specifically, for example, if the value of the first OLPC parameter set indication field is set to 1, a first p0 is determined from a first P0-PUSCH-Set-r16 with p0-PUSCH-SetID-r16 value equal to zero (i.e., p0-PUSCH-SetId-r16=0) (e.g., power boosting). Additionally, if the value of the second OLPC parameter set indication field is set to 1, a second p0 is determined from a first or second P0-PUSCH-Set-r16 with p0-PUSCH-SetID-r16 value equal to zero (i.e., p0-PUSCH-SetId-r16=0) (e.g., power boosting).

Aspects Related to Determining Default Power Control Parameters when an SRI Field is not Provided or when an SRI PUSCH Power Control ID Field is Provided In some cases, the UE 904 may use a second option for determining the first and second sets of power control parameters when the DCI received at 920 by the UE 904 lacks an SRI field and when an SRI PUSCH power control ID field is not provided to the UE 904. In such cases, the UE 904 may determine the parameters P0, alpha, PL-RS resource index, and closed loop index in different manners.

For example, in some cases, the UE 904 may determine a first P0 and a first alpha for the first set of default power control parameters that are mapped to a lowest set ID. More specifically, the first P0 and the first alpha may be determined from a value of P0-PUSCH-AlphaSet with the lowest set ID (e.g., lowest P0-PUSCH-AlphaSetId) in p0-AlphaSets of the PUSCH power control information. Similarly, the UE 904 may determine a second P0 and a second alpha for the second set of default power control parameters that are mapped to a second lowest set ID. More specifically, the second P0 and the second alpha may be determined from a value of P0-PUSCH-AlphaSet with the second lowest set ID (e.g., second lowest P0-PUSCH-AlphaSetId) in p0-AlphaSets of the PUSCH power control information.

In other cases, the UE 904 may determine the first P0 and the first alpha for the first set of default power control parameters that are mapped to a highest set ID. More specifically, the first P0 and the first alpha may be determined from a value of P0-PUSCH-AlphaSet with the highest set ID (e.g., highest P0-PUSCH-AlphaSetId) in p0-AlphaSets of the PUSCH power control information. Similarly, the UE 904 may determine a second P0 and a second alpha for the second set of default power control parameters that are mapped to a second highest set ID. More specifically, the second P0 and the second alpha may be determined from a value of P0-PUSCH-AlphaSet with the second highest set ID (e.g., second lowest P0-PUSCH-AlphaSetId) in p0-AlphaSets of the PUSCH power control information As noted above, the UE 904 may determine a PL-RS resource index for the first and second sets of default power control parameters in different manners. For example, in some cases, the UE 904 may be enabled with a default beam for path loss for SRS (e.g., enableDefaultBeamPL-ForSRS is configured) and is not provided a PUSCH path loss reference RS (e.g., PUSCH-PathlossReferenceRS and PUSCH-PathlossReferenceRS-r16 are not configured). In such cases, the UE 904 may determine a first PL-RS resource index associated with the first SRS resource set for the first set of default power control parameters and may determine a second PL-RS resource index associated with the second SRS resource set for the second set of default power control parameters. More specifically, for example, the UE 904 may use the first PR-RS resource index $q_d$ as for the first SRS resource set associated with the first set of repetitions transmitted at 930 in FIG. 9 by the UE 904 and may use a second PL-RS resource index $q'_d$ as for the second SRS resource set associated with the second set of repetitions transmitted at 930 in FIG. 9 by the UE 904.

In other cases, when UE 904 is not provided with an SRI PUSCH power control setting (e.g., SRI-PUSCH-PowerControl information element 403 illustrated in FIG. 4), the UE 904 may determine a first PL-RS resource index for the first set of default power control parameters based on a PUSCH path loss reference RS ID value of zero. Similarly, the UE 904 may determine a second PL-RS resource index for the second set of default power control parameters based on a PUSCH path loss reference RS ID value of one. More specifically, if the SRI-PUSCH-PowerControl information element is not provided to the UE 904, the UE 904 determines the first RS resource index $q_d$ with a respective PUSCH-PathlossReferenceRS-Id value being equal to zero and determines the second RS resource index $q'_d$ with a respective PUSCH-PathlossReferenceRS-Id value being equal to one.

Similarly, the ULE 904 may determine the closed loop index for the first and second sets of default power control parameters in different manners. For example, when the UE is not configured with two PUSCH power control adjustment states, both the first and second sets of default power control parameters include a closed loop index of zero. More specifically, when the UE 904 is not configured with two-PUSCH-PC-AdjustmentStates within PUSCH power control information received from the BS 902, l=0 may be used as the closed loop index for the first and second sets of default power control parameters.

In other cases, when the UE 904 is configured with two PUSCH power control adjustment states, the first set of default power control parameters may include a closed loop index of zero while the second set of default power control parameters may include a closed loop index of one. More specifically, when UE 904 is configured with twoPUSCH-PC-AdjustmentStates in the PUSCH power control information, l=0 may be used as the closed loop index for the first set of default power control parameters for the first set of PUSCH repetitions (associated with the first SRS resource set) and a closed loop index of 1=1 may be used for the second set of default power control parameters for the second set of PUSCH repetitions (associated with the second SRS resource set).

Additionally, as with the first option for determining the first and second sets of default power control parameters, the second option for determining the first and second sets of default power control parameters may also depend on a field in the DCI for dynamic order switching. For example, as noted above, in certain cases, a BS (e.g., BS 902) may dynamically switch an order in which a UE (e.g., UE 904) is to transmit PUSCH repetitions to TRPs. In other words, the field in the DCI indicates a dynamic switch in an order of which TRPs are targeted by which PUSCH repetition. In such cases, the UE 904 may decide, based on a field in the DCI, whether to use the first set of default power control parameters, the second set of default power control parameters, or both the first and second sets of default power control parameters.

For example, in some cases, the BS 902 may provide an indication in the DCI that indicates to the UE to switch an order of the PUSCH repetitions in one or more slots, such as switching the PUSCH repetition transmission within a first slot to the first TRP from the second TRP. In such cases, instead of the UE 904 using the second set of default power control parameters to transmit a PUSCH repetition to the second TRP in the first slot, the UE 904 may transmit the PUSCH repetition to the first TRP in the first slot using the first set of default power control parameters (e.g., based on the dynamic order switching indication in the DCI).

Example Methods for Communicating Using Power Control Parameters for mTRP PUSCH Repetition FIG. 10 is a flow diagram illustrating example operations 1000 for wireless communication. The operations 1000 may be performed, for example, by a BS (e.g., such as the BS 102 in the wireless communication network 100 of FIG. 1) for processing PUSCH repetitions based on power control parameters for mTRP communication. The operations 1000 may be implemented as software components that are executed and run on one or more processors (e.g., controller/processor 240 of FIG. 2). Further, the transmission and reception of signals by the BS in operations 1000 may be enabled, for example, by one or more antennas (e.g., antennas 234 of FIG. 2). In certain aspects, the transmission and/or reception of signals by the BS may be implemented via a bus interface of one or more processors (e.g., controller/processor 240, including the power control component 241) obtaining and/or outputting signals.

The operations 1000 begin at 1010 with transmitting a sounding reference signal (SRS) configuration to a user equipment (UE) indicating at least a first SRS resource set and at least a second SRS resource set.

In block 1020, the BS transmits downlink control information (DCI) scheduling a first set of one or more physical uplink shared channel (PUSCH) repetitions to a first transmitter receiver point (TRP) and a second set of one or more PUSCH repetitions to a second TRP.

In block 1030, the BS processes at least one of the first set of PUSCH repetitions based on a first set of default power control parameters or the second set of PUSCH repetitions based on a second set of default power control parameters In some cases, operation 1000 may further include providing, in a field in the DCI, an indication of whether to use: the first set of default power control parameters; the second set of default power control parameters; or both the first and second sets of default power control parameters. In some cases, the field in the DCI indicates a dynamic switch in an order of which TRPs are targeted by which PUSCH repetition.

In some cases, the first and second sets of default power control parameters comprise one or more of, a first parameter for controlling received power level, a second parameter for partial path loss compensation, a third parameter indicating a reference signal (RS) resource index for measuring path loss, and a closed loop index.

In some cases, at least one of the SRS resource sets is configured with a single SRS resource; and the DCI lacks an SRS resource indicator (SRI) field.

In some cases, the first SRS resource set is associated with a first SRI PUSCH power control information element with ID equal to zero and the second SRS resource set is associated with a second SRI PUSCH power control information element with ID equal to zero.

In some cases, the first set of default power control parameters is based on a mapping to the first SRI PUSCH power control information element with ID equal to zero and the second set of default power control parameters is based on a mapping to the second SRI PUSCH power control information element with ID equal to zero.

In some cases, operations 1000 further include transmitting a medium access control (MAC) control element (MAC-CE) indicating an update to a path loss reference signal associated with at least one of the first SRI PUSCH power control information element with ID equal to zero or the second SRI PUSCH power control information element with ID equal to zero.

In some cases, if a value of a first open loop power control (OLPC) parameter set indication field is set to a certain value, a first parameter for controlling received power level in the first set of default power control parameters comprises a first value. Additionally, in some cases, if a value of a second OLPC parameter set indication field is set to a certain value, a second parameter for controlling received power level in the second set of default power control parameters comprises a second value.

In some cases, at least one of the UE is not provided with an SRI PUSCH power control setting or the DCI lacks an SRS resource indicator (SRI) field.

In some cases, the first set of default power control parameters comprises a first parameter for controlling received power level and a second parameter for partial path loss compensation from a set of parameters mapped to a lowest set ID and the second set of default power control parameters comprises a second parameter for controlling received power level and a second parameter for partial path loss compensation from the set of parameters mapped to a second lowest set ID.

In some cases, the first set of default power control parameters comprises a first parameter for controlling received power level and a second parameter for partial path loss compensation from a set of parameters mapped to a highest set ID and the second set of default power control parameters comprises a second parameter for controlling received power level and a second parameter for partial path loss compensation from the set of parameters mapped to a second highest set ID.

In some cases, when a default beam for path loss for SRS is configured and a PUSCH path loss reference RS is not provided to the UE: the first set of default power control parameters comprises a parameter indicating a reference signal (RS) resource index for measuring path loss associated with a first RS resource index used for the first SRS resource set and the second set of default power control parameters comprises a parameter indicating an RS resource index for measuring path loss associated with a second RS resource index used for the second SRS resource set.

In some cases, when an SRI PUSCH power control setting is not provided to the UE: the first set of default power control parameters comprises a parameter indicating a reference signal (RS) resource index for measuring path loss associated with a first RS resource index based on a PUSCH path loss reference RS ID value of zero and the second set of default power control parameters comprises a parameter indicating a RS resource index for measuring path loss associated with a second RS resource index based on a PUSCH path loss reference RS ID value of one.

In some cases, when two PUSCH power control adjustment states are not configured for the UE, both the first and second sets of default power control parameters include a closed loop index of zero.

In some cases, when two PUSCH power control adjustment states are configured for the UE, the first set of default power control parameters include a closed loop index of zero and the second set of default power control parameters includes a closed loop index of one.

FIG. 11 is a flow diagram illustrating example operations 1100 for wireless communication, in accordance with certain aspects of the present disclosure. The operations 1100 may be performed, for example, by a UE (e.g., such as the UE 104 in the wireless communication network 100 of FIG. 1) for communicating using power control parameters for mTRP PUSCH repetition. The operations 1100 may be complementary to the operations 1000 performed by the BS. The operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280, including the power control component 281) obtaining and/or outputting signals.

The operations 1100 begin, in block 1110, with receiving a sounding reference signal (SRS) configuration indicating at least a first SRS resource set and at least a second SRS resource set In block 1120, the UE receives downlink control information (DCI) scheduling a first set of one or more physical uplink shared channel (PUSCH) repetitions to a first transmitter receiver point (TRP) and a second set of one or more PUSCH repetitions to a second TRP.

In block 1130, the UE transmits the first and second sets of PUSCH repetitions using at least one of a first set of default power control parameters or a second set of default power control parameters.

In some cases, operations 1100 may further include deciding, based on a field in the DCI, whether to use: the first set of default power control parameters; the second set of default power control parameters; or both the first and second sets of default power control parameters. In some cases, the field in the DCI indicates a dynamic switch in an order of which TRPs are targeted by which PUSCH repetition.

In some cases, the first and second sets of default power control parameters comprise one or more of, a first parameter for controlling received power level, a second parameter for partial path loss compensation, a third parameter indicating a reference signal (RS) resource index for measuring path loss, and a closed loop index.

In some cases, at least one of the SRS resource sets is configured with a single SRS resource and the DCI lacks an SRS resource indicator (SRI) field.

In some cases, the first SRS resource set is associated with a first SRI PUSCH power control information element with ID equal to zero and the second SRS resource set is associated with a second SRI PUSCH power control information element with ID equal to zero.

In some cases, the first set of default power control parameters is determined based on a mapping to the first SRI PUSCH power control information element with ID equal to zero and the second set of default power control parameters is determined based on a mapping to the second SRI PUSCH power control information element with ID equal to zero.

In some cases, operations 1100 may further include receiving a medium access control (MAC) control element (MAC-CE) indicating an update to a path loss reference signal associated with at least one of the first SRI PUSCH power control information element with ID equal to zero or the second SRI PUSCH power control information element with ID equal to zero.

In some cases, if a value of a first open loop power control (OLPC) parameter set indication field is set to a certain value, a first value for a first parameter for controlling received power level in the first set of default power control parameters is assumed. Additionally, in some cases, if a value of a second OLPC parameter set indication field is set to a certain value, a second value for a second parameter for controlling received power level in the second set of default power control parameters is assumed.

In some cases, at least one of the UE is not provided with an SRI PUSCH power control setting or the DCI lacks an SRS resource indicator (SRI) field.

In such cases, the first set of default power control parameters comprises a first parameter for controlling received power level and a second parameter for partial path loss compensation from a set of parameters mapped to a lowest set ID and the second set of default power control parameters comprises a second parameter for controlling received power level and a second parameter for partial path loss compensation from the set of parameters mapped to a second lowest set ID.

Additionally, in some cases, the first set of default power control parameters comprises a first parameter for controlling received power level and a second parameter for partial path loss compensation from a set of parameters mapped to a highest set ID and the second set of default power control parameters comprises a second parameter for controlling received power level and a second parameter for partial path loss compensation from the set of parameters mapped to a second highest set ID.

In some cases, when the UE is enabled with a default beam for path loss for SRS and is not provided a PUSCH path loss reference RS: the first set of default power control parameters comprises a parameter indicating a reference signal (RS) resource index for measuring path loss associated with a first RS resource index used for the first SRS resource set and the second set of default power control parameters comprises a parameter indicating an RS resource index for measuring path loss associated with a second RS resource index used for the second SRS resource set.

In some cases, when the UE is not provided with an SRI PUSCH power control setting: the first set of default power control parameters comprises a parameter indicating a reference signal (RS) resource index for measuring path loss associated with a first RS resource index determined based on a PUSCH path loss reference RS ID value of zero and the second set of default power control parameters comprises a parameter indicating a RS resource index for measuring path loss associated with a second RS resource index determined based on a PUSCH path loss reference RS ID value of one.

In some cases, when the UE is not configured with two PUSCH power control adjustment states, both the first and second sets of default power control parameters include a closed loop index of zero.

In some cases, when the UE is configured with two PUSCH power control adjustment states, the first set of default power control parameters include a closed loop index of zero and the second set of default power control parameters includes a closed loop index of one.

Example Wireless Communication Devices

Figure 12:
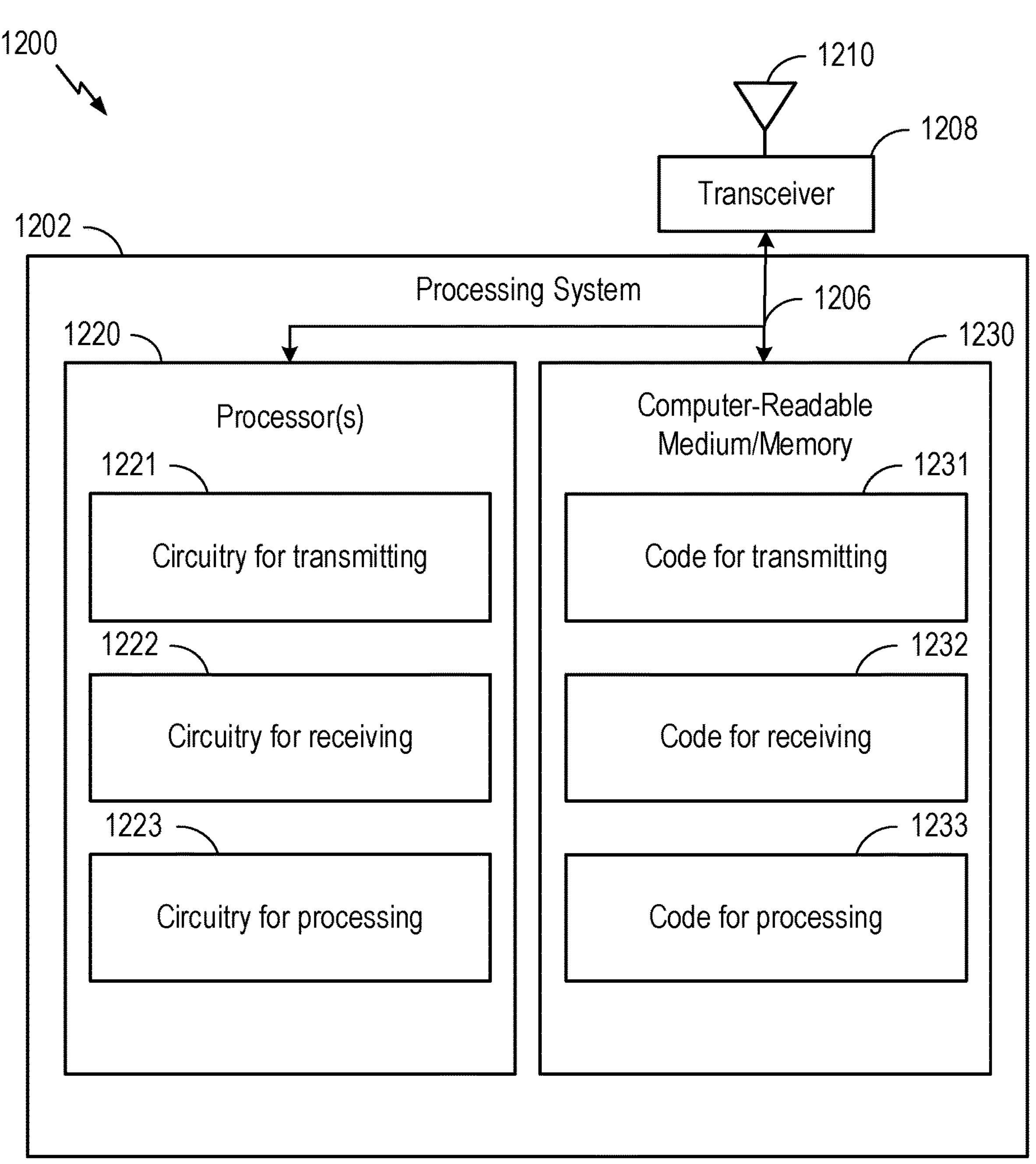
FIGS. 12 and 13 depict aspects of example communications devices.

FIG. 12 depicts an example communications device 1200 that includes various components operable, configured, or adapted to perform operations for the techniques disclosed herein, such as the operations depicted and described with respect to FIG. 9 and FIG. 10. In some examples, communication device 1200 may be a base station 102 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIG. 9 and FIG. 10, or other operations for performing the various techniques discussed herein for processing PUSCH repetitions based on power control parameters for mTRP communication.

In the depicted example, computer-readable medium/memory 1230 stores code 1231 for receiving, code 1232 for transmitting, and code 1233 for processing.

In the depicted example, the one or more processors 1220 include circuitry configured to implement the code stored in the computer-readable medium/memory 1230, including circuitry 1221 for receiving, circuitry 1222 for transmitting, and circuitry 1223 for processing.

Various components of communications device 1200 may provide means for performing the methods described herein, including with respect to FIG. 9 and FIG. 10.

In some examples, means for transmitting or sending (or means for outputting for transmission) may include the transceivers 232 and/or antenna(s) 234 of the base station 102 illustrated in FIG. 2 and/or transceiver 1208 and antenna 1210 of the communication device 1200 in FIG. 12.

In some examples, means for receiving (or means for obtaining) may include the transceivers 232 and/or antenna (s) 234 of the base station illustrated in FIG. 2 and/or transceiver 1208 and antenna 1210 of the communication device 1200 in FIG. 12.

In some examples, means for processing may include various processing system components, such as: the one or more processors 1220 in FIG. 12, or aspects of the base station 102 depicted in FIG. 2, including receive processor 238, transmit processor 220, TX MIMO processor 230, and/or controller/processor 240 (including power control component 241).

Notably, FIG. 12 is just one example, and many other examples and configurations of communication device 1200 are possible.

Figure 13:
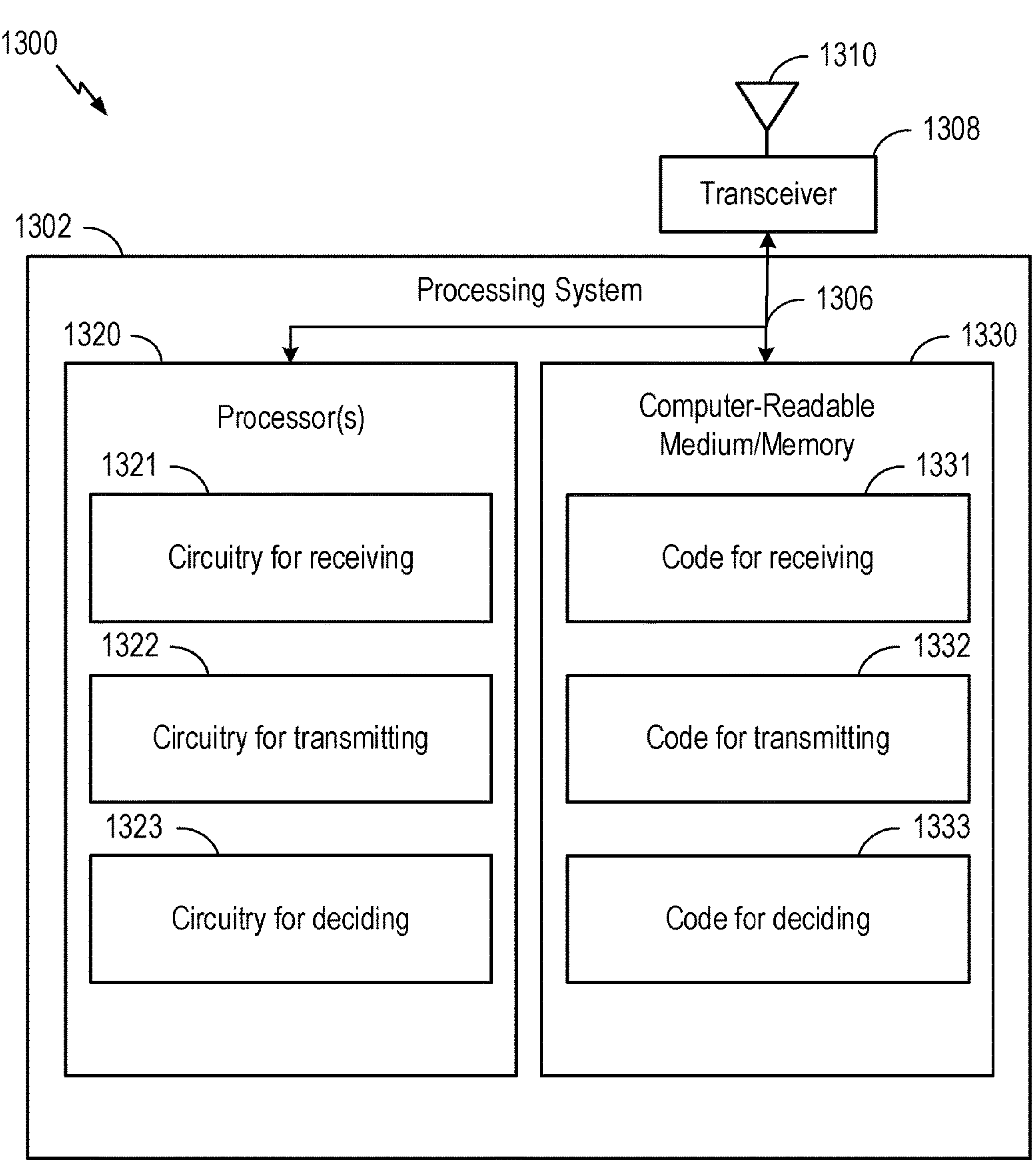

FIG. 13 depicts an example communications device 1300 that includes various components operable, configured, or adapted to perform operations for the techniques disclosed herein, such as the operations depicted and described with respect to FIGS. 9 and 11. In some examples, communication device 1300 may be a user equipment 104 as described, for example with respect to FIGS. 1 and 2.

Communications device 1300 includes a processing system 1302 coupled to a transceiver 1308 (e.g., a transmitter and/or a receiver). Transceiver 1308 is configured to transmit (or send) and receive signals for the communications device 1300 via an antenna 1310, such as the various signals as described herein. Processing system 1302 may be configured to perform processing functions for communications device 1300, including processing signals received and/or to be transmitted by communications device 1300.

Processing system 1302 includes one or more processors 1320 coupled to a computer-readable medium/memory 1330 via a bus 1306. In certain aspects, computer-readable medium/memory 1330 is configured to store instructions (e.g., computer-executable code) that when executed by the one or more processors 1320, cause the one or more processors 1320 to perform the operations illustrated in FIGS. 9 and 11, or other operations for performing the various techniques discussed herein for communicating using power control parameters for mTRP PUSCH repetition.

In the depicted example, computer-readable medium/memory 1330 stores code 1331 for receiving, code 1332 for transmitting, and code 1233 for deciding.

In the depicted example, the one or more processors 1320 include circuitry configured to implement the code stored in the computer-readable medium/memory 1330, including circuitry 1321 for receiving, circuitry 1322 for transmitting, and circuitry 1323 for deciding.

Various components of communications device 1300 may provide means for performing the methods described herein, including with respect to FIGS. 9 and 11.

In some examples, means for transmitting or sending (or means for outputting for transmission) may include the transceivers 254 and/or antenna(s) 252 of the user equipment 104 illustrated in FIG. 2 and/or transceiver 1308 and antenna 1310 of the communication device 1300 in FIG. 13.

In some examples, means for receiving (or means for obtaining) may include the transceivers 254 and/or antenna (s) 252 of the user equipment 104 illustrated in FIG. 2 and/or transceiver 1308 and antenna 1310 of the communication device 1300 in FIG. 13.

In some examples, means for deciding may include various processing system components, such as: the one or more processors 1320 in FIG. 13, or aspects of the user equipment 104 depicted in FIG. 2, including receive processor 258, transmit processor 264, TX MIMO processor 266, and/or controller/processor 280 (including power control 281).

Notably, FIG. 13 is just one example, and many other examples and configurations of communication device 1300 are possible.

EXAMPLE CLAUSES

Implementation examples are described in the following numbered clauses:

Clause 1: A method for wireless communications by a user equipment (UE), comprising: receiving a sounding reference signal (SRS) configuration indicating at least a first SRS resource set and at least a second SRS resource set; receiving downlink control information (DCI) scheduling a first set of one or more physical uplink shared channel (PUSCH) repetitions to a first transmitter receiver point (TRP) and a second set of one or more PUSCH repetitions to a second TRP; and transmitting the first and second sets of PUSCH repetitions using at least one of a first set of default power control parameters or a second set of default power control parameters.

Clause 2: The method of Clause 1, further comprising deciding, based on a field in the DCI, whether to use: the first set of default power control parameters; the second set of default power control parameters; or both the first and second sets of default power control parameters.

Clause 3: The method of Clause 2, wherein the field in the DCI indicates a dynamic switch in an order of which TRPs are targeted by which PUSCH repetition.

Clause 4: The method of any one of Clauses 1-3, wherein the first and second sets of default power control parameters comprise one or more of: a first parameter for controlling received power level, a second parameter for partial path loss compensation, a third parameter indicating a reference signal (RS) resource index for measuring path loss, and a closed loop index.

Clause 5: The method of any one of Clauses 1-4, wherein: at least one of the SRS resource sets is configured with a single SRS resource; and the DCI lacks an SRS resource indicator (SRI) field.

Clause 6: The method of Clause 5, wherein: the first SRS resource set is associated with a first SRI PUSCH power control information element with ID equal to zero; and the second SRS resource set is associated with a second SRI PUSCH power control information element with ID equal to zero.

Clause 7: The method of Clause 6, wherein: the first set of default power control parameters is determined based on a mapping to the first SRI PUSCH power control information element with ID equal to zero; and the second set of default power control parameters is determined based on a mapping to the second SRI PUSCH power control information element with ID equal to zero.

Clause 8: The method of any one of Clauses 6-7, further comprising receiving a medium access control (MAC) control element (MAC-CE) indicating an update to a path loss reference signal associated with at least one of the first SRI PUSCH power control information element with ID equal to zero or the second SRI PUSCH power control information element with ID equal to zero.

Clause 9: The method of any one of Clauses 6-8, wherein: if a value of a first open loop power control (OLPC) parameter set indication field is set to a certain value, a first value for a first parameter for controlling received power level in the first set of default power control parameters is assumed; and if a value of a second OLPC parameter set indication field is set to a certain value, a second value for a second parameter for controlling received power level in the second set of default power control parameters is assumed.

Clause 10: The method of any one of Clauses 1-4, wherein at least one of: the UE is not provided with an SRI PUSCH power control setting; or the DCI lacks an SRS resource indicator (SRI) field.

Clause 11: The method of Clause 10, wherein: the first set of default power control parameters comprises a first parameter for controlling received power level and a second parameter for partial path loss compensation from a set of parameters mapped to a lowest set ID; and the second set of default power control parameters comprises a second parameter for controlling received power level and a second parameter for partial path loss compensation from the set of parameters mapped to a second lowest set ID.

Clause 12: The method of Clause 10, wherein: the first set of default power control parameters comprises a first parameter for controlling received power level and a second parameter for partial path loss compensation from a set of parameters mapped to a highest set ID; and the second set of default power control parameters comprises a second parameter for controlling received power level and a second parameter for partial path loss compensation from the set of parameters mapped to a second highest set ID.

Clause 13: The method of any one of Clauses 10-12, wherein, when the UE is enabled with a default beam for path loss for SRS and is not provided a PUSCH path loss reference RS: the first set of default power control parameters comprises a parameter indicating a reference signal (RS) resource index for measuring path loss associated with a first RS resource index used for the first SRS resource set; and the second set of default power control parameters comprises a parameter indicating an RS resource index for measuring path loss associated with a second RS resource index used for the second SRS resource set.

Clause 14: The method of any one of Clauses 10-12, wherein, when the UE is not provided with an SRI PUSCH power control setting: the first set of default power control parameters comprises a parameter indicating a reference signal (RS) resource index for measuring path loss associated with a first RS resource index determined based on a PUSCH path loss reference RS ID value of zero; and the second set of default power control parameters comprises a parameter indicating a RS resource index for measuring path loss associated with a second RS resource index determined based on a PUSCH path loss reference RS ID value of one.

Clause 15: The method of any one of Clauses 10-14, wherein, when the UE is not configured with two PUSCH power control adjustment states, both the first and second sets of default power control parameters include a closed loop index of zero.

Clause 16: The method of any one of Clauses 10-14, wherein, when the UE is configured with two PUSCH power control adjustment states, the first set of default power control parameters include a closed loop index of zero and the second set of default power control parameters includes a closed loop index of one.

Clause 17: A method for wireless communications by a base station (BS), comprising: transmitting a sounding reference signal (SRS) configuration to a user equipment (UE) indicating at least a first SRS resource set and at least a second SRS resource set; transmitting downlink control information (DCI) scheduling a first set of one or more physical uplink shared channel (PUSCH) repetitions to a first transmitter receiver point (TRP) and a second set of one or more PUSCH repetitions to a second TRP; and processing at least one of the first set of PUSCH repetitions based on a first set of default power control parameters or the second set of PUSCH repetitions based on a second set of default power control parameters.

Clause 18: The method of Clause 17, further comprising providing, in a field in the DCI, an indication of whether to use: the first set of default power control parameters; the second set of default power control parameters; or both the first and second sets of default power control parameters.

Clause 19: The method of Clause 18, wherein the field in the DCI indicates a dynamic switch in an order of which TRPs are targeted by which PUSCH repetition.

Clause 20: The method of any one of Clauses 17-17, wherein the first and second sets of default power control parameters comprise one or more of: a first parameter for controlling received power level, a second parameter for partial path loss compensation, a third parameter indicating a reference signal (RS) resource index for measuring path loss, and a closed loop index.

Clause 21: The method of any one of Clauses 17-20, wherein: at least one of the SRS resource sets is configured with a single SRS resource; and the DCI lacks an SRS resource indicator (SRI) field.

Clause 22: The method of Clause 21, wherein: the first SRS resource set is associated with a first SRI PUSCH power control information element with ID equal to zero; and the second SRS resource set is associated with a second SRI PUSCH power control information element with ID equal to zero.

Clause 23: The method of Clause 22, wherein: the first set of default power control parameters is based on a mapping to the first SRI PUSCH power control information element with ID equal to zero; and the second set of default power control parameters is based on a mapping to the second SRI PUSCH power control information element with ID equal to zero.

Clause 24: The method of any one of Clauses 22-23, further comprising transmitting a medium access control (MAC) control element (MAC-CE) indicating an update to a path loss reference signal associated with at least one of the first SRI PUSCH power control information element with ID equal to zero or the second SRI PUSCH power control information element with ID equal to zero.

Clause 25: The method of any one of Clauses 22-24, wherein: if a value of a first open loop power control (OLPC) parameter set indication field is set to a certain value, a first parameter for controlling received power level in the first set of default power control parameters comprises a first value; and if a value of a second OLPC parameter set indication field is set to a certain value, a second parameter for controlling received power level in the second set of default power control parameters comprises a second value.

Clause 26: The method of any one of Clauses 17-20, wherein at least one of: the UE is not provided with an SRI PUSCH power control setting; or the DCI lacks an SRS resource indicator (SRI) field.

Clause 27: The method of Clause 26, wherein: the first set of default power control parameters comprises a first parameter for controlling received power level and a second parameter for partial path loss compensation from a set of parameters mapped to a lowest set ID; and the second set of default power control parameters comprises a second parameter for controlling received power level and a second parameter for partial path loss compensation from the set of parameters mapped to a second lowest set ID.

Clause 28: The method of Clause 26, wherein: the first set of default power control parameters comprises a first parameter for controlling received power level and a second parameter for partial path loss compensation from a set of parameters mapped to a highest set ID; and the second set of default power control parameters comprises a second parameter for controlling received power level and a second parameter for partial path loss compensation from the set of parameters mapped to a second highest set ID.

Clause 29: The method of any one of Clauses 26-28, wherein, when a default beam for path loss for SRS is configured and a PUSCH path loss reference RS is not provided to the UE: the first set of default power control parameters comprises a parameter indicating a reference signal (RS) resource index for measuring path loss associated with a first RS resource index used for the first SRS resource set; and the second set of default power control parameters comprises a parameter indicating an RS resource index for measuring path loss associated with a second RS resource index used for the second SRS resource set.

Clause 30: The method of any one of Clauses 26-28, wherein, when an SRI PUSCH power control setting is not provided to the UE: the first set of default power control parameters comprises a parameter indicating a reference signal (RS) resource index for measuring path loss associated with a first RS resource index based on a PUSCH path loss reference RS ID value of zero; and the second set of default power control parameters comprises a parameter indicating a RS resource index for measuring path loss associated with a second RS resource index based on a PUSCH path loss reference RS ID value of one.

Clause 31: The method of any one of Clauses 26-30, wherein, when two PUSCH power control adjustment states are not configured for the UE, both the first and second sets of default power control parameters include a closed loop index of zero.

Clause 32: The method of any one of Clauses 26-30, wherein, when two PUSCH power control adjustment states are configured for the UE, the first set of default power control parameters include a closed loop index of zero and the second set of default power control parameters includes a closed loop index of one.

Clause 33: An apparatus, comprising: a memory comprising executable instructions; and one or more processors configured to execute the executable instructions and cause the apparatus to perform a method in accordance with any one of Clauses 1-32.

Clause 34: An apparatus, comprising means for performing a method in accordance with any one of Clauses 1-32.

Clause 35: A non-transitory computer-readable medium comprising executable instructions that, when executed by one or more processors of an apparatus, cause the apparatus to perform a method in accordance with any one of Clauses 1-32.

Clause 36: A computer program product embodied on a computer-readable storage medium comprising code for performing a method in accordance with any one of Clauses 1-32.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

At UE 104, antennas 252*a*-252*r* may receive the downlink signals from the BS 102 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 102.

At BS 102, the uplink signals from UE 104 may be received by antennas 234*a-t*, processed by the demodulators in transceivers 232*a*-232*t*, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (p) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu}\times 15$ kHz, where is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of communicating using power control parameters for mTRP PUSCH repetition in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UNITS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communications by a user equipment (UE), comprising:

receiving a configuration indicating at least a first sounding reference signal (SRS) resource set associated with a first SRS resource indicator (SRI) physical uplink shared channel (PUSCH) power control information element with an identifier (ID) equal to zero and at least a second SRS resource set associated with a second SRI PUSCH power control information element with an ID equal to zero;

receiving downlink control information (DCI) scheduling a first set of one or more PUSCH repetitions to a first transmitter receiver point (TRP) and a second set of one or more PUSCH repetitions to a second TRP; and transmitting the first set of PUSCH repetitions and the second set of PUSCH repetitions using a first set of default power control parameters determined based on a mapping to the first SRI PUSCH power control information element with the ID equal to zero and a second set of default power control parameters determined based on a mapping to the second SRI PUSCH power control information element with the ID equal to zero.

2. The method of claim 1, further comprising deciding, based on a field in the DCI, whether to use:

the first set of default power control parameters;

the second set of default power control parameters; or both the first set of default power control parameters and the second set of default power control parameters.

3. The method of claim 2, wherein the field in the DCI indicates a dynamic switch in an order of which TRPs are targeted by which PUSCH repetition.

4. The method of claim 1, wherein the first set of default power control parameters and the second set of default power control parameters comprise one or more of: a first parameter for controlling received power level, a second parameter for partial path loss compensation, a third parameter indicating a reference signal (RS) resource index for measuring path loss, and a closed loop index.

5. The method of claim 1, wherein:

at least one of the first SRS resource set or the second SRS resource set is configured with a single SRS resource; and the DCI lacks an SRS resource indicator (SRI) field.

6. The method of claim 5, wherein:

if a value of a first open loop power control (OLPC) parameter set indication field is set to a certain value, a first value for a first parameter for controlling received power level in the first set of default power control parameters is assumed; and if a value of a second OLPC parameter set indication field is set to a certain value, a second value for a second parameter for controlling received power level in the second set of default power control parameters is assumed.

7. The method of claim 1, wherein at least one of:

the UE is not provided with an SRI PUSCH power control setting; or the DCI lacks an SRS resource indicator (SRI) field.

8. The method of claim 7, wherein:

the first set of default power control parameters comprises a first parameter for controlling received power level and a second parameter for partial path loss compensation from a set of parameters mapped to a lowest set ID; and the second set of default power control parameters comprises a second parameter for controlling received power level and a second parameter for partial path loss compensation from the set of parameters mapped to a second lowest set ID.

9. The method of claim 7, wherein:

the first set of default power control parameters comprises a first parameter for controlling received power level and a second parameter for partial path loss compensation from a set of parameters mapped to a highest set ID; and the second set of default power control parameters comprises a second parameter for controlling received power level and a second parameter for partial path loss compensation from the set of parameters mapped to a second highest set ID.

10. The method of claim 7, wherein, when the UE is enabled with a default beam for path loss for SRS and is not provided a PUSCH path loss reference RS:

the first set of default power control parameters comprises a parameter indicating a reference signal (RS) resource index for measuring path loss associated with a first RS resource index used for the first SRS resource set; and the second set of default power control parameters comprises a parameter indicating an RS resource index for measuring path loss associated with a second RS resource index used for the second SRS resource set.

11. The method of claim 7, wherein, when the UE is not provided with an SRI PUSCH power control setting:

the first set of default power control parameters comprises a parameter indicating a reference signal (RS) resource index for measuring path loss associated with a first RS resource index determined based on a PUSCH path loss reference RS ID value of zero; and the second set of default power control parameters comprises a parameter indicating a RS resource index for measuring path loss associated with a second RS resource index determined based on a PUSCH path loss reference RS ID value of one.

12. The method of claim 7, wherein, when the UE is not configured with two PUSCH power control adjustment states, both the first set of default power control parameters and the second set of default power control parameters include a closed loop index of zero.

13. The method of claim 7, wherein, when the UE is configured with two PUSCH power control adjustment states, the first set of default power control parameters include a closed loop index of zero and the second set of default power control parameters includes a closed loop index of one.

14. A method for wireless communications by a network entity, comprising:

transmitting a configuration indicating at least a first sounding reference signal (SRS) resource set associated with a first SRS resource indicator (SRI) physical uplink shared channel (PUSCH) power control information element with an identifier (ID) equal to zero and at least a second SRS resource set associated with a second SRI PUSCH power control information element with an ID equal to zero for a user equipment (UE);

transmitting downlink control information (DCI) scheduling a first set of one or more PUSCH repetitions to a first transmitter receiver point (TRP) and a second set of one or more PUSCH repetitions to a second TRP; and processing the first set of PUSCH repetitions based on a first set of default power control parameters determined based on a mapping to the first SRI PUSCH power control information element with the ID equal to zero and the second set of PUSCH repetitions based on a second set of default power control parameters determined based on a mapping to the second SRI PUSCH power control information element with the ID equal to zero.

15. The method of claim 14, further comprising providing, in a field in the DCI, an indication of whether to use:

the first set of default power control parameters;

the second set of default power control parameters; or both the first set of default power control parameters and the second set of default power control parameters.

16. The method of claim 15, wherein the field in the DCI indicates a dynamic switch in an order of which TRPs are targeted by which PUSCH repetition.

17. The method of claim 14, wherein the first set of default power control parameters and the second set of default power control parameters comprise one or more of: a first parameter for controlling received power level, a second parameter for partial path loss compensation, a third parameter indicating a reference signal (RS) resource index for measuring path loss, and a closed loop index.

18. The method of claim 14, wherein:

at least one of the first SRS resource set or the second SRS resource set is configured with a single SRS resource; and the DCI lacks an SRS resource indicator (SRI) field.

19. The method of claim 18, wherein:

if a value of a first open loop power control (OLPC) parameter set indication field is set to a certain value, a first parameter for controlling received power level in the first set of default power control parameters comprises a first value; and if a value of a second OLPC parameter set indication field is set to a certain value, a second parameter for controlling received power level in the second set of default power control parameters comprises a second value.

20. The method of claim 14, wherein at least one of:

the UE is not provided with an SRI PUSCH power control setting; or the DCI lacks an SRS resource indicator (SRI) field.

21. The method of claim 20, wherein:

the first set of default power control parameters comprises a first parameter for controlling received power level and a second parameter for partial path loss compensation from a set of parameters mapped to a lowest set ID; and the second set of default power control parameters comprises a second parameter for controlling received power level and a second parameter for partial path loss compensation from the set of parameters mapped to a second lowest set ID.

22. The method of claim 20, wherein:

the first set of default power control parameters comprises a first parameter for controlling received power level and a second parameter for partial path loss compensation from a set of parameters mapped to a highest set ID; and the second set of default power control parameters comprises a second parameter for controlling received power level and a second parameter for partial path loss compensation from the set of parameters mapped to a second highest set ID.

23. The method of claim 20, wherein, when a default beam for path loss for SRS is configured and a PUSCH path loss reference RS is not provided to the UE:

the first set of default power control parameters comprises a parameter indicating a reference signal (RS) resource index for measuring path loss associated with a first RS resource index used for the first SRS resource set; and the second set of default power control parameters comprises a parameter indicating an RS resource index for measuring path loss associated with a second RS resource index used for the second SRS resource set.

24. The method of claim 20, wherein, when an SRI PUSCH power control setting is not provided to the UE:

the first set of default power control parameters comprises a parameter indicating a reference signal (RS) resource index for measuring path loss associated with a first RS resource index based on a PUSCH path loss reference RS ID value of zero; and the second set of default power control parameters comprises a parameter indicating a RS resource index for measuring path loss associated with a second RS resource index based on a PUSCH path loss reference RS ID value of one.

25. The method of claim 20, wherein, when two PUSCH power control adjustment states are not configured for the UE, both the first set of default power control parameters and the second set of default power control parameters include a closed loop index of zero.

26. The method of claim 20, wherein, when two PUSCH power control adjustment states are configured for the UE, the first set of default power control parameters include a closed loop index of zero and the second set of default power control parameters includes a closed loop index of one.

27. A processing system for wireless communications by a user equipment (UE), comprising:

one or more processors individually or collectively configured to execute instructions stored on one or more memories to cause the UE to:

receive a configuration indicating at least a first sounding reference signal (SRS) resource set associated with a first SRS resource indicator (SRI) physical uplink shared channel (PUSCH) power control information element with an identifier (ID) equal to zero and at least a second SRS resource set associated with a second SRI PUSCH power control information element with an ID equal to zero;

receive downlink control information (DCI) scheduling a first set of one or more PUSCH repetitions to a first transmitter receiver point (TRP) and a second set of one or more PUSCH repetitions to a second TRP; and transmit the first set of PUSCH repetitions and the second set of PUSCH repetitions using a first set of default power control parameters determined based on a mapping to the first SRI PUSCH power control information element with the ID equal to zero and a second set of default power control parameters determined based on a mapping to the second SRI PUSCH power control information element with the ID equal to zero.

28. A processing system for wireless communications by a network entity, comprising:

one or more processors individually or collectively configured to execute instructions stored on one or more memories and to cause the network entity to:

transmit a configuration to a user equipment (UE) indicating at least a first sounding reference signal (SRS) resource set associated with a first SRS resource indicator (SRI) physical uplink shared channel (PUSCH) power control information element with an identifier (ID) equal to zero and at least a second SRS resource set associated with a second SRI PUSCH power control information element with an ID equal to zero;

transmit downlink control information (DCI) scheduling a first set of one or more PUSCH repetitions to a first transmitter receiver point (TRP) and a second set of one or more PUSCH repetitions to a second TRP; and process the first set of PUSCH repetitions based on a first set of default power control parameters determined based on a mapping to the first SRI PUSCH power control information element with the ID equal to zero and the second set of PUSCH repetitions based on a second set of default power control parameters determined based on a mapping to the second SRI PUSCH power control information element with the ID equal to zero.

* * * * *